(12) United States Patent
Kim et al.

(10) Patent No.: US 7,418,843 B2
(45) Date of Patent: Sep. 2, 2008

(54) DRUM TYPE WASHING MACHINE

(75) Inventors: Gon Kim, Changwon-si (KR); Chi Wan Hur, Changwon-si (KR); Yu Beom Kang, Changwon-si (KR); Sang Man Je, Koje-si (KR); Kang Mo Choi, Masan-si (KR); Jae Kyum Kim, Gimhae-si (KR); Ho Cheol Kwon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 10/730,281

(22) Filed: Dec. 9, 2003

(65) Prior Publication Data

US 2004/0163428 A1 Aug. 26, 2004

(30) Foreign Application Priority Data

Dec. 10, 2002 (KR) ............... 10-2002-0078337
Dec. 2, 2003 (KR) ............... 10-2003-0086841

(51) Int. Cl.
*B08B 3/12* (2006.01)
*D06F 21/00* (2006.01)
*D06F 23/00* (2006.01)
*D06F 25/00* (2006.01)

(52) U.S. Cl. ............... 68/140; 68/3 R; 68/23.1; 68/253 C; 68/269 C; 68/269 R; 310/216; 310/217; 310/254; 310/257; 310/258; 310/259; 310/261; 310/263; 310/264

(58) Field of Classification Search ............... 68/23.1, 68/24, 140, 3 R, 253 C, 269 B, 269 R; 188/266, 188/381; 310/179, 216, 217, 254, 257–259, 310/261, 263, 264

See application file for complete search history.

(56) References Cited

U.S. PATENT DOCUMENTS

| 2,705,763 A | 4/1955 | Skrobishch |
| 3,886,256 A | 5/1975 | Ohuchi et al. |
| 5,040,285 A | 8/1991 | Williams et al. |
| 5,266,855 A * | 11/1993 | Smith et al. ............... 310/90 |
| 5,489,811 A | 2/1996 | Kern et al. |
| 5,809,809 A | 9/1998 | Neumann |
| 6,257,027 B1 | 7/2001 | Imai |
| 6,460,382 B1 | 10/2002 | Kim et al. |
| 6,477,869 B2 | 11/2002 | Heyder et al. |

FOREIGN PATENT DOCUMENTS

| AU | 199675404 B2 | 12/1996 |
| AU | 199675438 B2 | 12/1996 |

(Continued)

*Primary Examiner*—Michael Barr
*Assistant Examiner*—Rita R Patel
(74) *Attorney, Agent, or Firm*—McKenna Long & Aldridge LLP

(57) ABSTRACT

A washing machine has a tub that may be made of plastic. A drum is rotatably installed in the tub. A shaft may pass through the tub and connect to the drum for transmission of a driving power from a motor to the drum. The washing machine has a bearing supporting part and a stator fastening part extended in a radial direction from the bearing supporting part, where the tub has an inner surface and an outer surface, and the bearing supporting part and the stator fastening part are disposed between the inner surface and the outer surface of the tub.

88 Claims, 14 Drawing Sheets

FOREIGN PATENT DOCUMENTS

| | | |
|---|---|---|
| AU | 199675404 B2 | 6/1997 |
| AU | 199675438 B2 | 6/1997 |
| CN | 1274782 | 11/2000 |
| CN | 1293276 | 5/2001 |
| DE | 4335966 | 4/1995 |
| DE | 19859568 | 6/2000 |
| EP | 0219115 A2 | 4/1987 |
| EP | 0219115 A2 | 4/1987 |
| EP | 0361775 A2 | 4/1990 |
| EP | 0361775 A2 | 4/1990 |
| EP | 0620308 A2 | 10/1994 |
| EP | 0620308 A2 | 10/1994 |
| EP | 1079014 A1 | 2/2001 |
| EP | 1079014 A1 | 2/2001 |
| EP | 1094144 A2 | 4/2001 |
| EP | 1094144 A2 | 4/2001 |
| EP | 1094145 A2 | 4/2001 |
| EP | 1094145 A2 | 4/2001 |
| EP | 1116812 A1 | 7/2001 |
| EP | 1116812 A1 | 7/2001 |
| EP | 1428 924 A1 | 6/2004 |
| GB | 2030896 A | 4/1980 |
| GB | 2030896 A | 4/1980 |
| GB | 2332212 A | 6/1999 |
| GB | 2332212 A | 6/1999 |
| GB | 2333300 A | 7/1999 |
| GB | 2333300 A | 7/1999 |
| JP | 58207834 | 12/1983 |
| JP | 2000-116037 | 4/2000 |
| KR | 20-1992-0012151 | 7/1992 |
| KR | 20-1998-0058943 | 10/1998 |
| KR | 1999-0030909 | 5/1999 |
| KR | 1999-0081170 | 11/1999 |
| KR | 10-2001-0088215 A | 9/2001 |
| KR | 20010088215 | 9/2001 |
| WO | WO 01/44556 A1 | 6/2001 |
| WO | WO 01/44556 A1 | 6/2001 |
| WO | WO 02/084842 A1 | 10/2002 |
| WO | WO 02/084842 A1 | 10/2002 |

\* cited by examiner

DRUM TYPE WASHING MACHINE

This application claims the benefit of the Korean Application Nos. P2002-0078337 filed on Dec. 10, 2002, and P2003-0086841 filed on Dec. 02, 2003, which are hereby incorporated by references.

BACKGROUND OF THE INVENTION

1. Field of the Invention

The present invention relates to drum type washing machines, and more particularly, to an improved structure of a driving part of a direct drive type drum type washing machine which employs an outer rotor type brushless DC motor.

2. Background of the Related Art

In general, a drum type washing washes laundry by using a friction force between a drum rotated by a driving power of a motor and the laundry in a state detergent, washing water, and the laundry are introduced into the drum, shows almost no damage to, and entangling of the laundry, and has pounding, and rubbing washing effects.

In the related art drum type washing machines, there are an indirect drive type in which the driving power of the motor is transmitted to the drum through a belt wound on a motor pulley and a drum pulley indirectly, and a direct drive type in which the brushless DC (BLDC) motor is connected to the drum directly, to transmit the driving power of the motor to the drum, directly.

The type in which the driving power of the motor is transmitted to the drum, not directly, but indirectly through the motor pulley and the drum pulley, has much energy loss in the course of power transmission, and causes much noise in the course of power transmission.

According to this, it is the present trend that use of the direct drive type drum type washing machines with the BLDC motor is increasing, for solving the problems of the indirect drive type drum type washing machines. A related art direct drive type drum type washing machine will be described with reference to FIG. 1, briefly. FIG. 1 illustrates a longitudinal section of a related art drum type washing machine.

Referring to FIG. 1, the related art drum type washing machine is provided with a tub 2 mounted inside of a cabinet 1, and a drum 3 rotatably mounted on a central part of an inside of the tub 2. There is a motor in rear of the tub 2, wherein a stator 6 is fixed to a rear wall of the tub, and a rotor 5 surrounds the stator 6, and is connected to the drum 3 with a shaft passed through the tub.

Together with these, there is a metallic tub supporter between a tub rear wall and the stator having a shape almost the same with an outer shape of the tub rear wall fixed to the tub rear wall in fastening the stator for supporting a load of the stator, and maintaining a concentricity of the stator.

In the meantime, there are a door 21 mounted on a front part of the cabinet 1, and a gasket 22 between the door 21 and the tub 2.

There are a hanging spring 23 between an inside surface of an upper part of the cabinet 1, and an upper part of an outside circumferential surface of the tub 2, and a friction damper 24 between the inside surface of a lower part of the cabinet 1, and a lower part of the outside circumferential surface of the tub 2.

FIG. 2 illustrates a perspective outside view of the stator in FIG. 1, and FIG. 3 illustrates a perspective view of a sectional type core SC applied to the stator in FIG. 2.

In a related art method for fabricating the stator core, a sheet of metal plate is pressed to form a unit core having tooth portions 151, a base part 150, and a round part 500 opposite to the tooth portions 151 for forming fastening hole 500a therein, the unit cores are stacked to form a unit core assembly, and the unit core assemblies are connected to each other in a circumferential direction, to complete fabrication of the stator core, called the sectional type core SC.

The round part provides the fastening hole 500a for fixing the stator 6 to the rear wall of the tub, and enduring a fastening force of a bolt.

However, the method for fabricating the stator 6 by means of the sectional type cores SC has, not only a complicate fabrication process, but also loss of much material.

Therefore, even if a helical type core HC is favorable, in which a sheet of steel plate having the tooth portions 151 and the base part 150 is stacked turning in a helix, since it is required to bend the sheet of metal punched out in a form of a band into the helix, the helical type core has a drawback in that the round part for fixing the stator to the tub can not be formed on an inner side of the core.

This is because, if the round part 500 is formed on the inner side of the core in fabrication of the helical core HC, a large width of the core at a part having the round part formed thereon impedes bending of the core.

Therefore, currently, a stator structure is required, in which a function the same with the round part of the sectional type core SC is made to be carried out, not by the core itself, but by other part, for employing the helical type core HC.

For reference, a reason why it is important to secure an adequate rigidity of the round part having the fastening hole formed in for fixing the stator to the tub is as follows.

The washing machine that rotates the drum directly by using the BLDC motor has the stator mounted on a rear part of the tub, directly. In a case of the motor for a large capacity drum type washing machine with more than 1.5 kg of stator net weight, and a spinning speed in a range of 600~2000 RPM, it is liable that a bolt fastened part of the stator 6 is broken due to the stator weight, vibration in the high speed rotation, and shaking and deformation of the rotor 5.

Particularly, in a case of the drum type washing machine, in which the BLDC motor is used, and the stator 6 is fixed to the tub rear wall, where an axis direction of the stator 6 is substantially parallel to ground, the vibration generated in operation of the washing machine causes intensive damage to the fastening part of the stator 6 to the tub rear wall.

Thus, an adequate rigidity of the round part having the fastening hole formed therein is very important in fixing the stator 6 to the tub.

In the meantime, in a trend a capacity of the drum type washing machine becomes larger as the time goes by, there have been many problems, such as even the tub to which the stator is fastened is damaged in a case the stator has a weight more than 1.5 kg in a structure the axis of the stator is parallel to the ground like the drum type washing machine.

Therefore, in order to prevent occurrence of the damage, in the related art structure, in general a metal tub supporter is lined, when a process for fastening the tub supporter to the tub rear wall is required in addition to an assembly line, that drops a productivity.

SUMMARY OF THE INVENTION

Accordingly, the present invention is directed to a drum type washing machine that substantially obviates one or more of the problems due to limitations and disadvantages of the related art.

An object of the present invention is to provide a drum type washing machine, which has an outer rotor type motor with a stator of which material and weight required for fabrication can be reduced, fabrication of which can be simplified, and secure mounting of which on the tub is possible.

Other object of the present invention is to provide a drum type washing machine, in which a tub can sustain weight and vibration of a BLDC motor for a washing machine mounted on a tub wall directly, which motor has a net stator weight more than 1.5 kg, and variable rotational speed of 0~2000 RPM or over.

Another object of the present invention is to provide a drum type washing machine, which can dispense with a tub supporter fastening process from an assembly line, that can secure a supporting force of the tub rear wall to the stator, and simplifies an assembly process.

Further object of the present invention is to provide a drum type washing machine, which enables a service man to carry out maintenance in repair and replacement of components.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the drum type washing machine includes a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

In other aspect of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having three or more than three fastening holes projected toward an inside of the helical type core for fastening the stator to the bearing housing.

In another aspect of the present invention, there is provided a drum type washing machine including a tub of a plastic having a wall for holding washing water therein and mounting a driving part thereon a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended from the bearing supporting part exposed to an outside of the tub, with stator fastening holes formed in an exposed part of the stator fastening part, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

In further object of the present invention, there is provided a drum type washing machine including a tub of a plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended in a radial direction from the bearing supporting part exposed to an outside of the tub, with stator fastening holes formed in an exposed part of the stator fastening part, a rotor engaged to a rear end part of the shaft to form the motor together with the stator, and the stator mounted on the stator fastening part of the bearing housing with fastening members on an inner side of the rotor to form the motor together with the rotor, wherein the stator includes an annular helical type core having multiple layers formed by winding a steel plate having tooth portions and a base part in a helix starting from a bottom layer to a top layer, an insulator having the helical type core encapsulated therein, a coil wound on the tooth portions, and fastening parts formed as a unit with the insulator, having three or more than three fastening holes projected toward an inside of the helical type core for fastening the stator to the bearing housing.

In still further object of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part, and a stator fastening part extended in a radial direction from the bearing supporting part, wherein both of the bearing supporting part and the stator fastening part are inserted in a tub rear wall, while stator fastening holes in the stator fastening part are exposed, a rotor engaged to a rear end part of the shaft to form the motor together with the stator, and the stator mounted on the stator fastening part of the bearing housing with fastening members on an inner side of the rotor to form the motor together with the rotor.

In yet further aspect of the present invention, there is provided a drum type washing machine including a tub of plastic having a wall for holding washing water therein and mounting a driving part thereon, a drum rotatably arranged inside of the tub, a shaft passed through the tub and connected to the drum for transmission of a driving power from a motor to the drum, at least one bearing for supporting the shaft, a bearing housing having a sleeve form of bearing supporting part inserted in the tub rear wall, and a stator fastening part formed as a unit with the bearing supporting part extended in a radial direction from the bearing supporting part exposed to an outside of the tub, with stator fastening holes formed in an exposed part, a rotor engaged to a rear end part of the shaft to form the motor together with the stator; and the stator with a weight heavier than 1.5 kg mounted on the stator fastening part of the bearing housing with fastening members on an inner side of the rotor to form the motor together with the rotor.

In still yet further aspect of the present invention, there is provided a drum type washing machine including a tub having a wall for holding washing water therein and mounting a driving part thereon, and a sleeve form of bearing supporting part for supporting bearings, in which both the tub and the bearing supporting part are formed as one unit, a drum rotatably arranged inside of the tub, a shaft passed through the tub and connected to the drum for transmission of a driving power from a motor to the drum, at least one bearing inside of the bearing supporting part for supporting the shaft, a rotor engaged to a rear end part of the shaft to form the motor together with the stator, and the stator mounted on the tub on an inner side of the rotor and an outer side of the bearing supporting part with fastening members, wherein the stator includes an annular helical type core having multiple layers formed by winding a steel plate having tooth portions and base part in a helix starting from a bottom layer to a top layer, an insulator having the helical type core encapsulated therein, a coil wound on the tooth portions, and fastening parts formed as a unit with the insulator, having fastening holes projected toward an inside of the helical type core for fastening the stator to the bearing housing.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings FIGS. 4~14.

Figure 1:
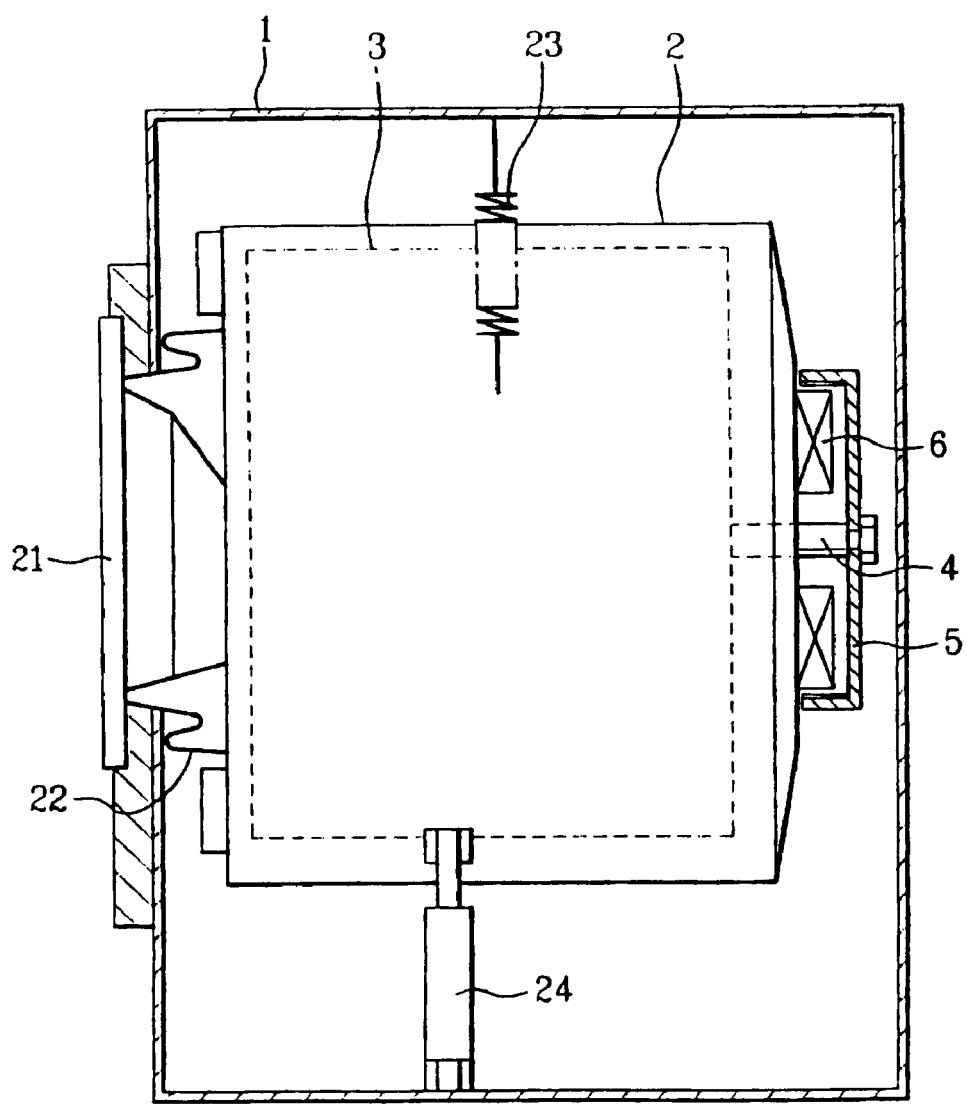
FIG. 1 illustrates a longitudinal section of a related art direct drive, drum type washing machine, schematically.
Figure 2:
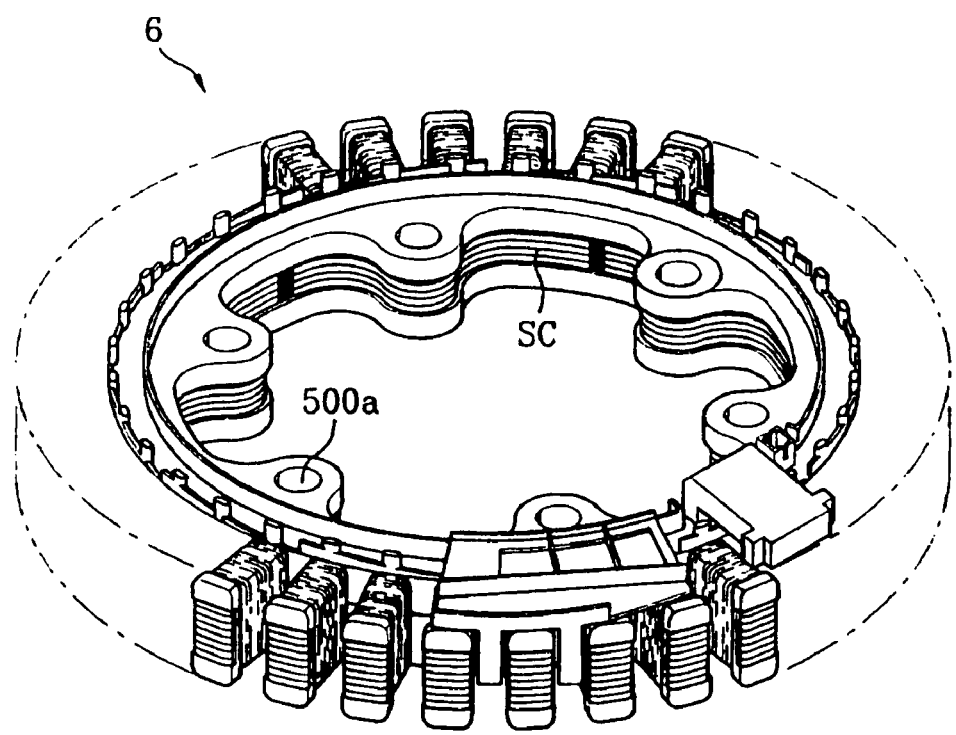
FIG. 2 illustrates a perspective view of a related art stator.
Figure 3:
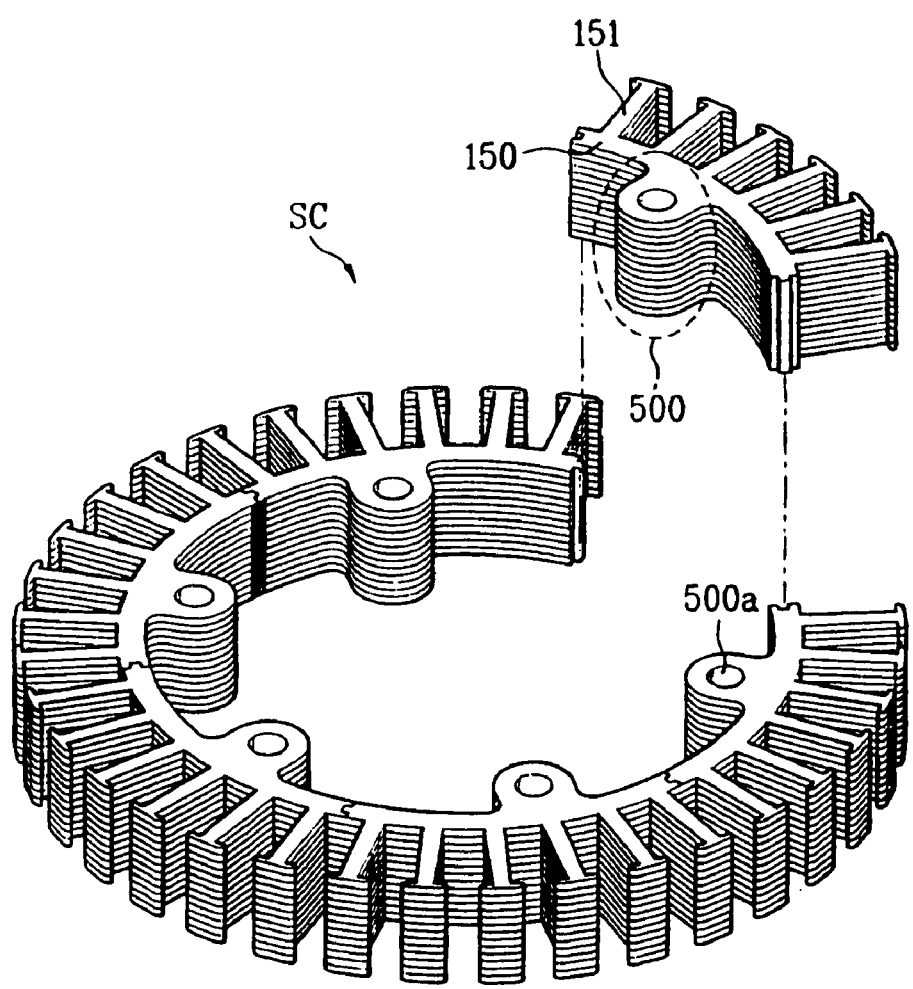
FIG. 3 illustrates a perspective view of a sectional type core.
Figure 4:
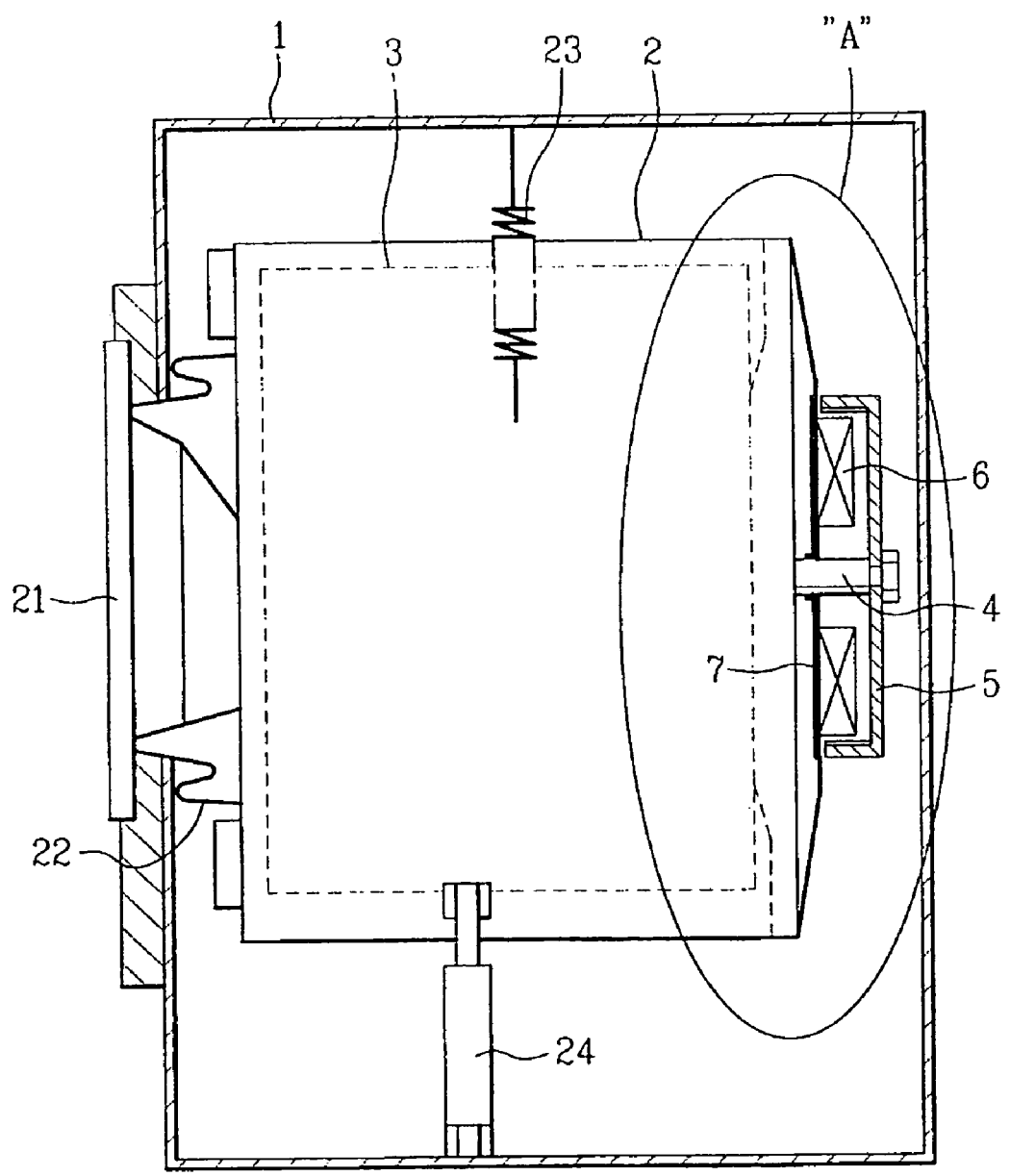
FIG. 4 illustrates a longitudinal section of a direct drive, drum type washing machine in accordance with a preferred embodiment of the present invention, schematically.
Figure 5:
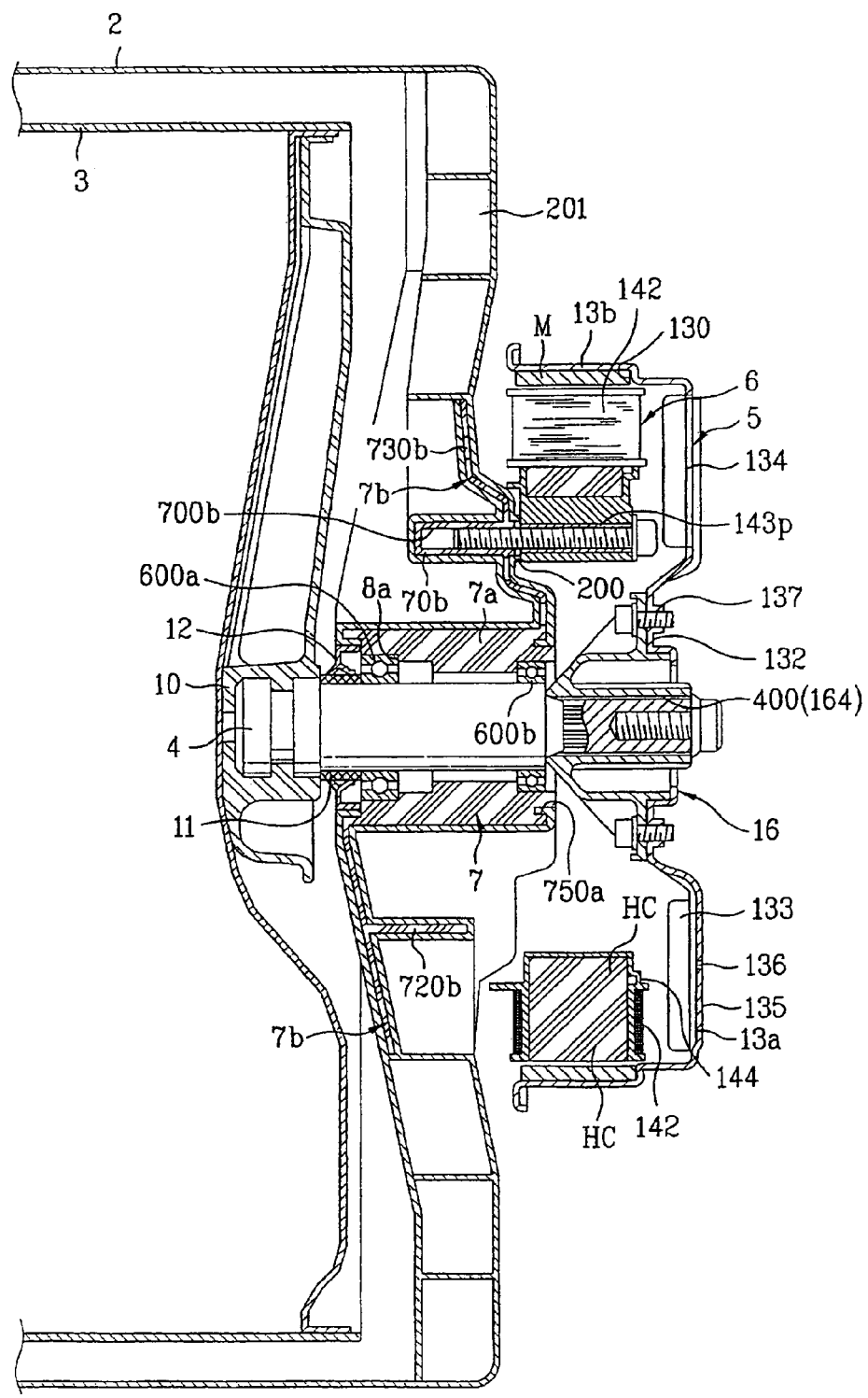
FIG. 5 illustrates an enlarged longitudinal sectional view of an 'A' part in FIG. 4 of the drum type washing machine of the present invention.

FIG. 4 illustrates a longitudinal section of a direct drive, drum type washing machine in accordance with a preferred embodiment of the present invention schematically, and FIG. 5 illustrates an enlarged longitudinal sectional view of an 'A' part in FIG. 4 of the drum type washing machine of the present invention.

Figure 6:
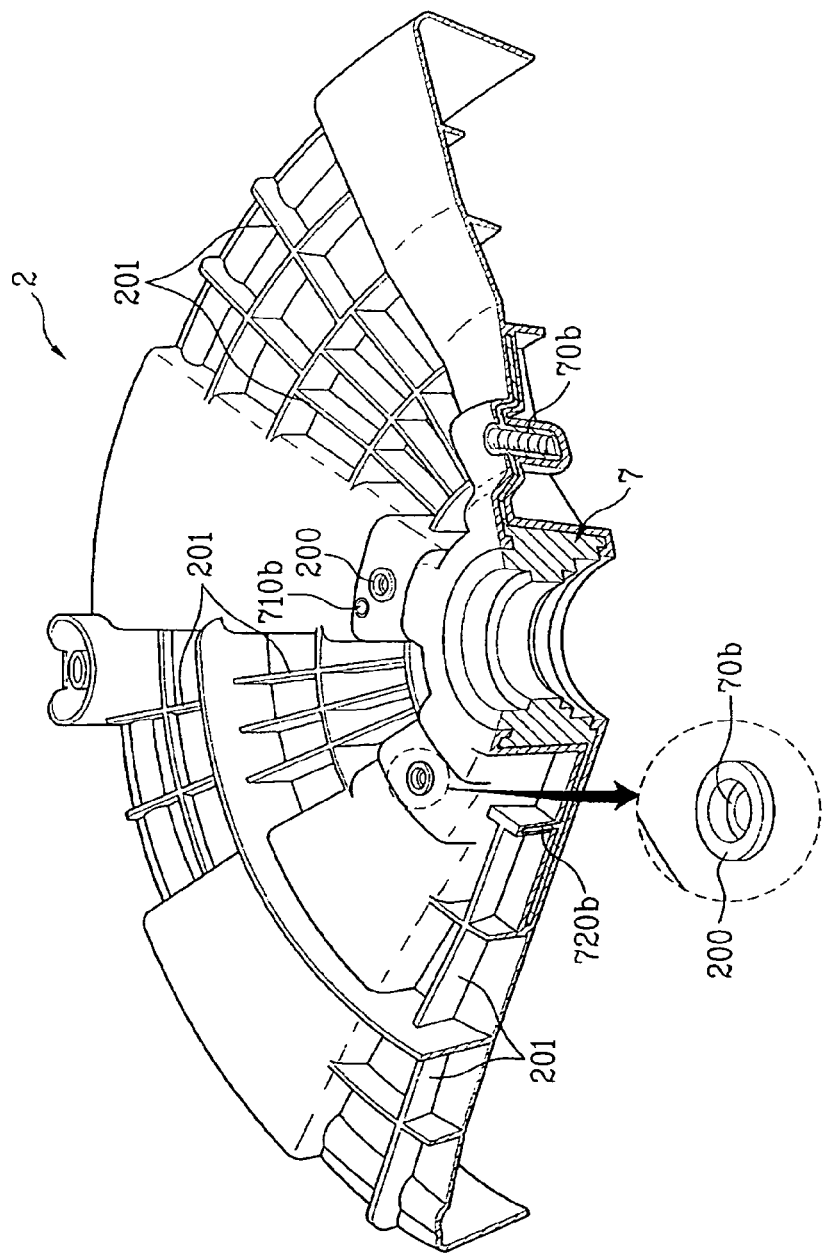
FIG. 6 illustrates a cut away perspective view of a tub rear wall.
Figure 7:
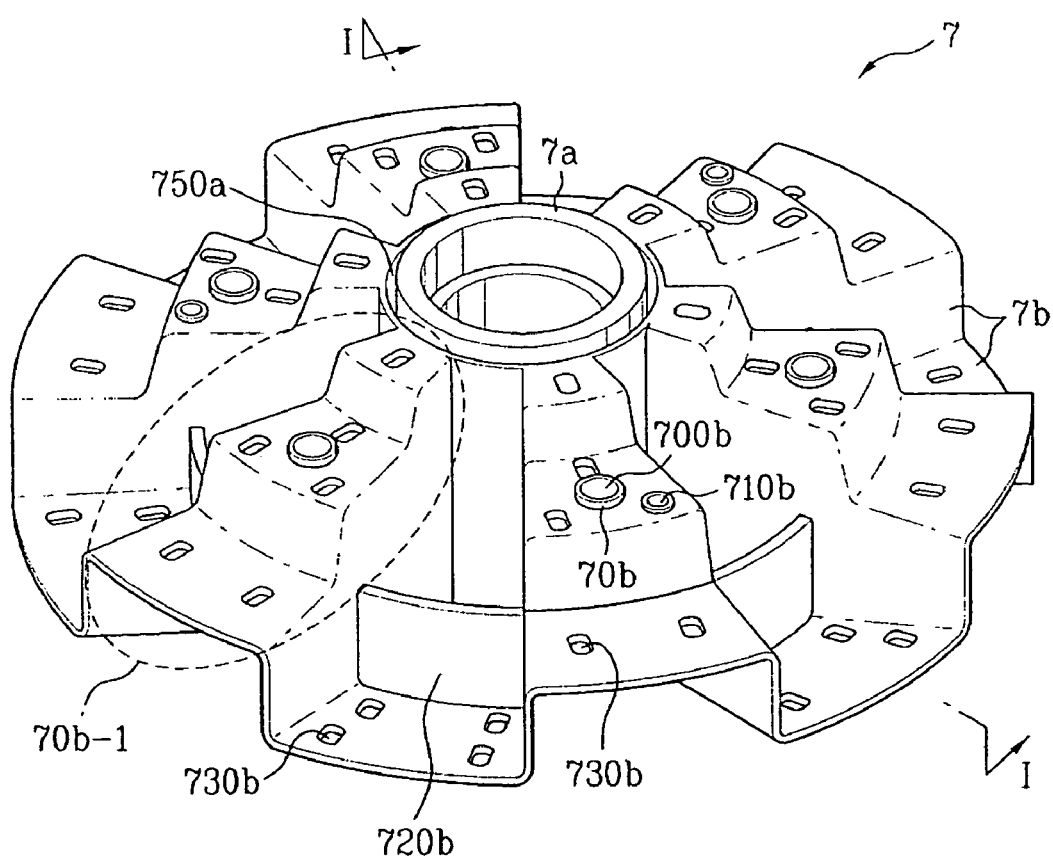
FIG. 7 illustrates a perspective view of the unitary bracket and bearing housing in FIG. 5.
Figure 8:
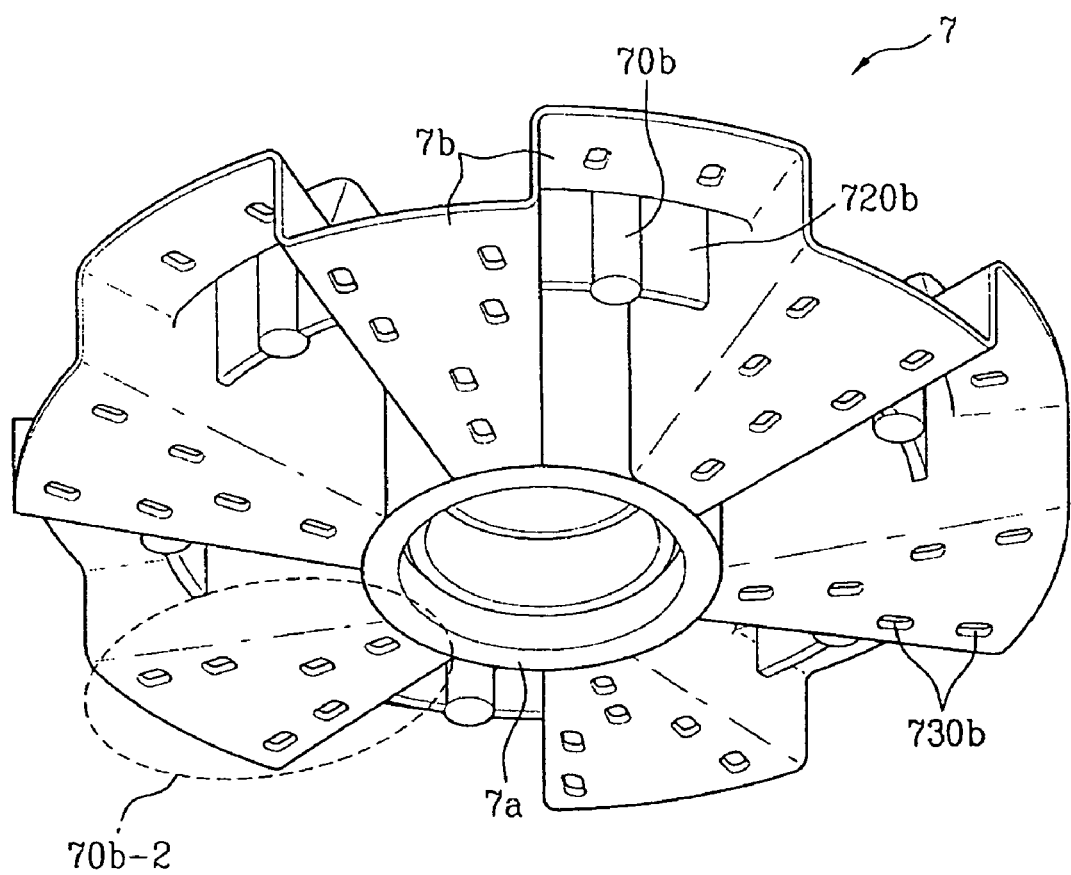
FIG. 8 illustrates a backside perspective view of FIG. 7.
Figure 9:
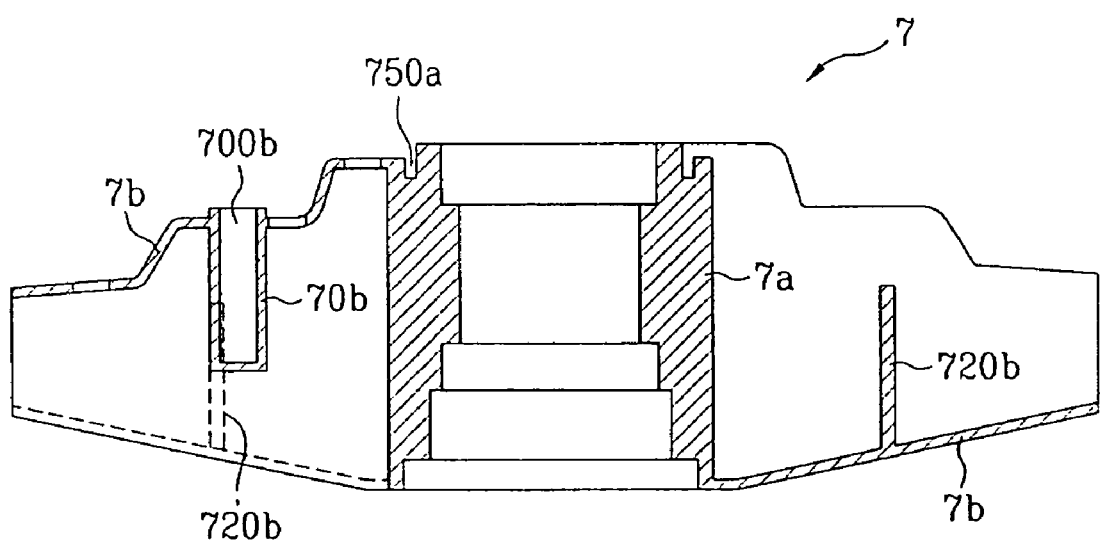
FIG. 9 illustrates a section across a line I-I in FIG. 7.

FIG. 6 illustrates a cut away perspective view of a tub rear wall, FIG. 7 illustrates a perspective view of the unitary bracket and bearing housing in FIG. 5, FIG. 8 illustrates a backside perspective view of FIG. 7, and FIG. 9 illustrates a section across a line I-I in FIG. 7.

Figure 10:
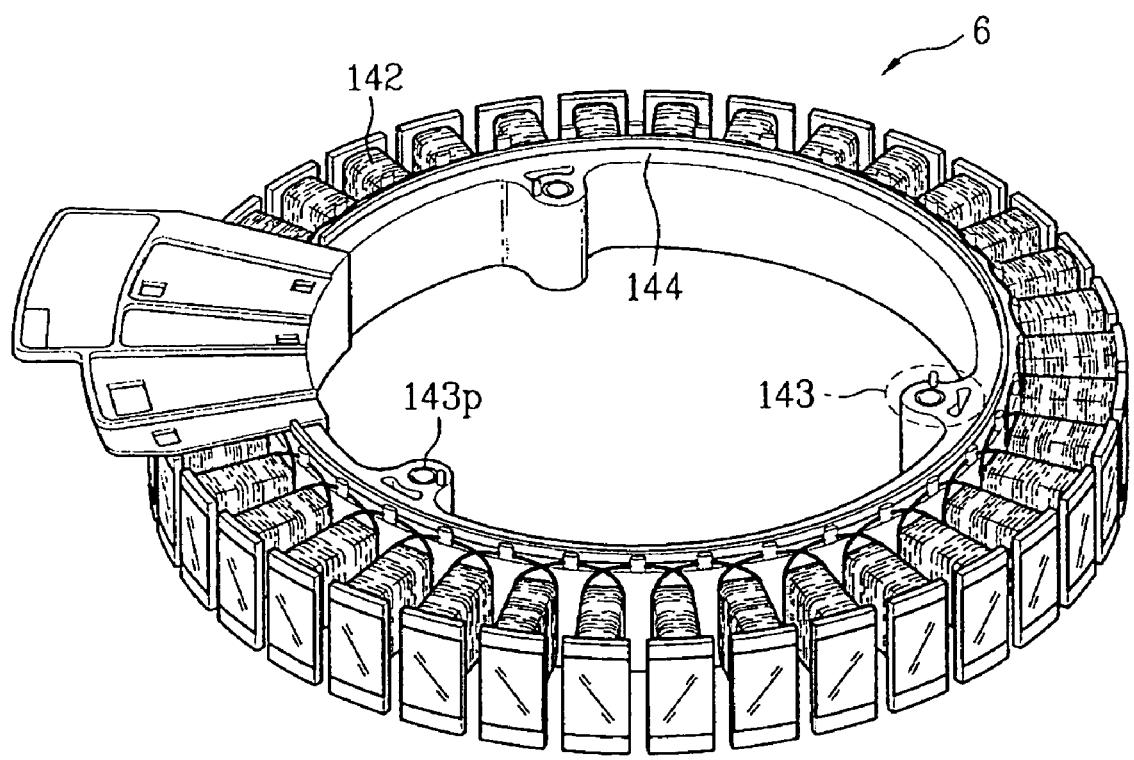
FIG. 10 illustrates a perspective view of the stator in FIG. 5.
Figure 11:
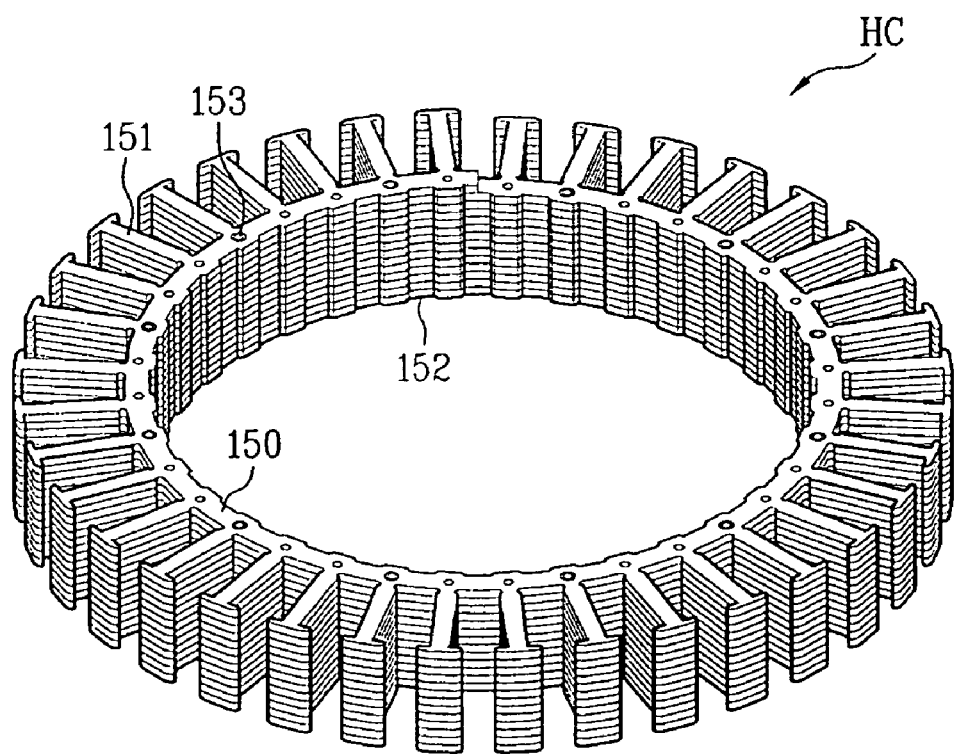
FIG. 11 illustrates a perspective view of the helical type core in FIG. 10.
Figure 12A:
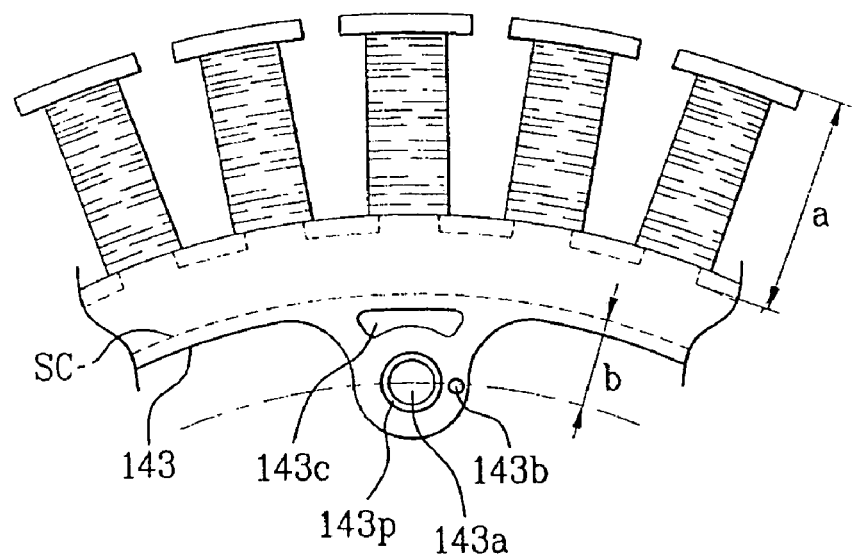
FIG. 12A illustrates a plan view of key parts of the stator in FIG. 10.
Figure 12B:
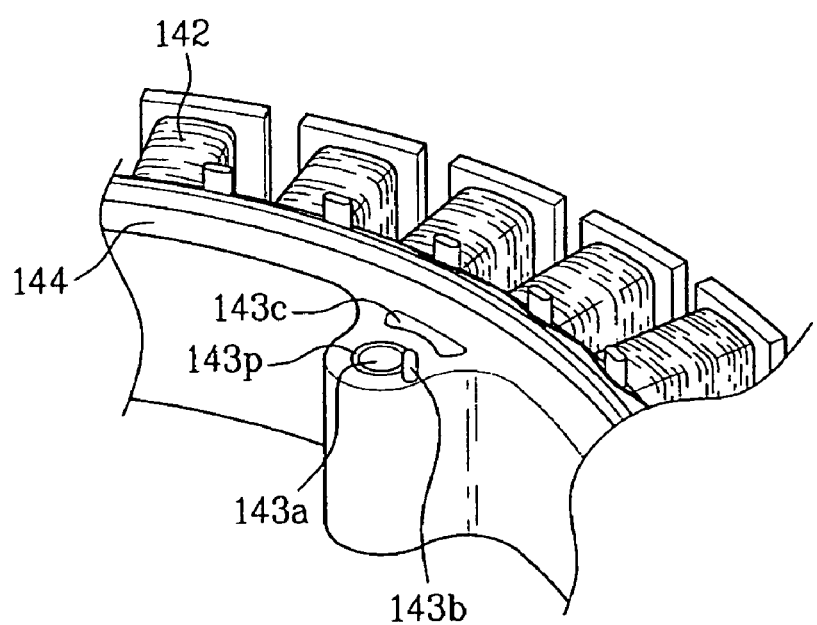
FIG. 12B illustrates a perspective view of key parts of the stator in FIG. 10.

FIG. 10 illustrates a perspective view of the stator in FIG. 5, FIG. 11 illustrates a perspective view of the helical type core in FIG. 10, FIG. 12A illustrates a plan view of key parts of the stator in FIG. 10, and FIG. 12B illustrates a perspective view of key parts of the stator in FIG. 10.

The drum type washing machine of the present invention, having a tub 2 inside of a cabinet 1 for holding washing water, with a wall for fixing a driving part thereto, a drum 3 inside of the tub 2, a shaft 4 connected to the drum 3 with a shaft for transmission of a driving power from a motor to the drum 3, and a bearing for supporting the shaft 4, wherein the tub 2 is formed of a plastic, and includes a metal bearing housing 7 at a central part of a rear wall of the tub 2 both for supporting the bearings at both ends of an outside circumferential surface of the shaft 4 and fastening the stator 6.

The bearing housing 7 is formed of an aluminum alloy and the like, and integrated with the tub rear wall by inserting the bearing housing 7 in a mold in an injection molding of the tub 2 of plastic.

In the meantime, referring to FIG. 5, the bearing housing 7 includes a bearing supporting part 7a of a sleeve form for supporting the bearings, a stator fastening part 7b formed as a unit with the bearing supporting part 7a extended form a rear end of the bearing supporting part 7a in a radial direction, and stator fastening holes 700b in the stator fastening part 7b, wherein both the bearing supporting part 7a and the stator fastening part 7b are inserted in the tub 2 rear wall, when only the stator fastening holes 700b are exposed.

Referring to FIGS. 7 and 8, the stator fastening part 7b, extended from the sleeve form of bearing supporting part 7a in the radial direction outwardly, includes stepped areas 70b-1 each having at least one step in the outward extension in a direction of the outward extension, and flat areas 70b-2 each between adjacent stepped areas 70b-1, wherein the stepped areas 70b-1 and the flat areas 70b-2 are connected to each other, respectively.

That is, the stator fastening part 7b includes the stepped areas 70b-1 each having steps as the stepped area 70b-1 extends in an outward radial direction, and flat areas 70b-2 between the stepped areas 70b-1, wherein each of the areas 70b-1 extended from an upper end of the bearing supporting part 7a in the outward radial direction is bent down at preset intervals as the stepped area 70b-1 extends in the outward radial direction, and each of the areas 70b-2 connected to a lower end of the bearing housing 7 is flat.

There is a resin stuffing groove 750a around the upper part of the bearing housing 7 for enhancing a bonding force with the tub 2 in the insert injection molding.

Referring to FIGS. 6 and 7, there is a positioning hole 710b formed adjacent to a stator fastening hole 700b of the stator fastening part 7b in correspondence to a positioning projection on the stator 6.

Referring to FIG. 6, there is a boss 200 at a part of the tub rear wall opposite to each of the stator fastening holes 700b for preventing the stator fastening part 7b from coming into direct contact with the stator 6, thereby preventing an insulator of the stator 6 from being broken due to a fastening force applied thereto in mounting the stator 6.

It is also preferable that the stator fastening part 7b has a circumferential rib 720b at a position spaced a distance from an axis of the bearing supporting part 7a for increasing a bonding force with the plastic in the injection molding of the tub 2. Though it is preferable that there are fastening bosses 70b each with a stator fastening hole 700b on the rib 720, it is not necessarily required to form the fastening holes 700b on the rib 720b.

In addition to this, there are circumferential and radial reinforcing ribs 201 on a region excluding the bearing housing stepped area of the tub rear wall for reinforcing the tub rear wall.

In the meantime, different from the foregoing stator fastening part 7b, the stator fastening part 7b may be an extension from the sleeve form of the bearing supporting part 7a the same with the foregoing stator fastening part 7b, but separated at regular intervals in a circumferential direction to form a plurality of separated radial segments.

Referring to FIGS. 5 and 6, the bearing housing 7 of metal has a step 8a in an inside circumferential surface for supporting, and preventing the bearings 600a on the inside circumferential surface from breaking away from the bearing housing 7.

A front part of the shaft 4 is fixed to a spider 10 in a rear wall of the drum 3, and a section of the shaft 4 from an exposed part in rear of the spider 10 to a front bearing 600a has a brass bushing 11 press fit thereon for preventing the shaft 4 from rusting, with a sealing member 12 fitted on an outside surface of the bushing 11 for preventing infiltration of water toward the bearing.

The shaft 4 has the rotor 5 of the direct drive motor mounted at a center of rear end thereof, on an inner side of which the stator 14 is positioned, that is mounted on the tub rear wall to form the direct drive motor together with the rotor 5.

Referring to FIG. 5, the rotor 5, formed of steel plate, has a circumferential bent part with a seating surface 130 for seating magnets M placed on an inside surface of a side wall 13b extended forward from an edge of a rear wall of the rotor 5, and a hub 132 in a center part of the rear wall 13a having through holes for passing fastening members 15a, such as bolts, in mounting the rotor 5 on the shaft 4.

It is preferable that the rotor 5 is formed by pressing.

The rotor 5 has a plurality of radial cooling fins 133 around the hub 132 for blowing air toward the stator 6 when the rotor 5 rotates, to cool down heat from the stator 6. Each of the cooling fins 133 has a length in the radial direction.

The cooling fin 133 is formed by lancing to be bent at 90° from the rear wall to direct an opened side of the rotor 5, and a through hole 134 formed in the lancing serves as an air hole.

The rotor 5 has embossing 135 between adjacent cooling fins 133 of the rear wall 13a for reinforcing the rotor 5, and drain holes 136 in the embossing 135.

The rotor 5 has fastening holes 137 for fastening a connector 16 engaged with a rear end part of the shaft 4 in rear of a rear bearing 600b by means of serration, and positioning holes 138 for positioning the connector in mounting the connector on the shaft 4, both of which fastening holes 137 and positioning holes 138 are formed around the through hole 131 in the hub 132 at regular intervals.

The connector 16 is formed of plastic having a vibration mode different from the rotor 5 of steel plate, and serves as a bushing for the rotor, too. The connector 16 has serration 164 fit to the serration 400 in the rear end part of the shaft 4.

The tub rear wall has a hub part for putting the bearing supporting part 7a of the bearing housing 7 therein in the injection molding of the tub 2.

According to this, the present invention permits to dispense with the tub supporter which is essential in the related art, to reduce assembly man power in an assembly line, and improve a productivity.

That is, the present invention permits to dispense with the tub supporter, which is a separate part having an almost same outside shape with the tub rear wall, fixed to, and holds the tub rear wall in mounting the stator 6, and maintains a concentricity of the stator 6.

Referring to FIG. 10, the stator 6 includes a helical type core HC, an insulator 144 having the helical type core HC encapsulated therein, a coil wound around tooth portions 151 of the helical type core HC, and fastening parts 143 molded as a unit with the insulator 144 projected toward an inside of the helical type core HC from three, or more than three places, and in general weighs more than 1.5 kg as the capacity of the drum type washing becomes larger.

The helical type core HC has multiple layers formed by winding a steel plate having the tooth portions and the base part in a helix starting from a bottom layer to a top layer, with the tooth portions 151 projected outwardly in a radial direction from the base part. The base part 150 has recesses 152 for reducing stress in the winding of the helical type core.

The multiple layers of the helical type core HC are fastened with rivets 153 passed through through holes in the base part 150. A starting part and an end part of the helical type core HC may be welded at the base parts 150 in contact thereto. The recess 152 in the base part 150 may be rectangular, trapezoidal, or an arc.

Referring to FIGS. 12A and 12B, in the stator 6 having three or more than three fastening parts 143 formed as a unit with the insulator so as to be projected in a radial direction toward inside from the inside circumferential surface of the helical type core, each of the fastening parts 143 is formed to meet a condition of $a \geq b$, where "a" denotes a length of the tooth portion 151 from an outer edge of the base part 150, and "b" denotes a distance from an inner edge of the base part 150 to a center of the fastening hole 143a.

The fastening part 143 has a height greater than 20% of a total core stack height, and preferably equal to the total core stack height.

The fastening part 143 has at least one cavity 143c for damping vibration at the time of motor driving, and a positioning pin 143b fit to the positioning hole 710b in the stator fastening part exposed in a state inserted in the tub rear wall.

In the meantime, there is a metal tube 143p or a spring pin forcibly inserted in the fastening hole 143a of the fastening part 143.

The operation of the driving part of the drum type washing machine of the present invention will be described.

Under the control of a controller (not shown) attached to a panel for driving the motor, if current flows to the coils 142 in the stator 6 in succession, to rotate the rotor 5, the shaft 4 engaged with the connector 16 having the rotor 5 fixed thereto by means of serration rotates. According to this, the power is transmitted to the drum 3 through the shaft 4, to rotate the drum 3.

In the meantime, performance of the foregoing drum type washing machine will be described.

At first, since the tub 2 is formed of a heat resistant plastic, the tub 2 is light, and since the tub 2 is injection molded, the tub 2 is easy to fabricate.

Since the bearing housing 7 is formed of a metal, such as an aluminum alloy, which shows little thermal deformation even at a high temperature, the bearing housing 7 can be used in the drum type washing machine having the spinning cycle.

Since the bearing housing 7 of metal is inserted in the hub of the tub rear wall at the time of injection molding of the tub 2 of plastic, to form an integrated type tub 2 and bearing housing 7, that permits to dispense with the additional process of mounting the bearing housing 7 on the tub rear wall, thereby simplifying the assembly process, and reduce an assembly man power.

Referring to FIG. 11, the recess 152 in the base part 150 of the stator 6 reduces a stress in winding the core, thereby permitting an easy and small power winding.

Especially, referring to FIG. 12A, in the stator 6 having three or more than three fastening parts 143 formed as a unit with the insulator so as to be projected in a radial direction toward inside from the inside circumferential surface of the helical type core, each of the fastening parts 143 is formed to meet a condition of $a \geqq b$, where "a" denotes a length of the tooth portion 151 from an outer edge of the base part 150, and "b" denotes a distance from an inner edge of the base part 150 to a center of the fastening hole 143a.

The condition is set taking a case into account, in which, even though the closer the position of the fastening hole 143a to a point a load exerts thereon, the better in view of reduction of a torque, the position of the fastening hole 143a set at a position close excessively to the point a load exerts thereon leads to a bolt of smaller diameter, to require an excessively many number of bolts.

Referring to FIG. 12B, the fastening part 143 has a height greater than 20% of a total core stack height, otherwise the fastening part 143 is liable to break due to vibration caused by motor driving. Especially, the fastening par 143 may have a height equal to or higher than the total core stack height.

However, because an excessively high fastening part 143 increases a total width of the driving part, and reduces a washing capacity of the washing machine, the height of the fastening part 143 is limited not to exceed two times of the total core stack height.

The cavity 143c in the fastening part 143 dampens vibration at the time of motor driving, to improve mechanical reliability of the stator 6.

The positioning pin 143b on the fastening part 143 fits to the positioning hole 710b in the tub 2, thereby permitting an easy mounting of the stator 6 on the tub 2.

The sleeve form of bearing supporting part 7a for supporting bearings fitted therein, and the stator fastening part 7b for fastening the stator 6 thereto, of the bearing housing 7, both of which are formed as a unit, can dispense with the related art tub supporter.

The boss 200 at a part of the tub rear wall opposite to each of the stator fastening holes 700b prevents the stator fastening part 7b from coming into direct contact with the stator 6, thereby preventing the insulator of the stator 6 from being broken due to a fastening force applied thereto in mounting the stator 6.

The stepped areas 70b-1 each having steps at preset intervals as the stepped area 70b-1 extends in an outward radial direction of the cylindrical bearing supporting part 7a, and the flat areas 70b-2 between adjacent stepped areas 70b-1 and connected to the stepped areas 70b-1 in a circumferential direction with flat parts perpendicular thereto permit to increase bonding force to the tub 2 in the injection molding of the tub 2.

In addition to this, the circumferential rib 720b at a position spaced a distance from an axis of the bearing supporting part 7a also increases a bonding force with the plastic in the injection molding of the tub 2.

Moreover, the through holes 730b in the stator fastening part 7b increases the bonding force with the plastic in the insert injecting molding of the bearing housing 7.

The fastening boss 70b with the stator fastening hole 700b in the bearing housing 7 can dispense with formation of fastening holes in the tub 2, additionally.

That is, according to the present invention, the stator 6 is fastened to the stator fastening holes 700b in the fastening boss 70b of the stator fastening part 7b buried in the tub rear wall with bolts.

The positioning hole 710b formed adjacent to the stator fastening hole 700b of the stator fastening part 7b in correspondence to a positioning projection on the insulator of the stator 6 improves workability in mounting the stator 6 on the tub rear wall.

Of course, the positioning hole 710b in the stator fastening part 7b is formed, not covered with plastic, but exposed, and in a case the positioning hole is formed in the insulator, the positioning projection will be formed on the stator fastening part 7b.

Since the front end of the shaft 4 is fixed to the spider 10 in the rear wall of the drum 3, and a section of the shaft 4 from a part exposed to an outside of the spider 10 to the front bearing 600a has the brass busing 11 forcibly press fit thereon, rusting of the shaft 4 is prevented.

The sealing member 12 on the outside surface of the bushing 11 prevents infiltration of water toward the bearing.

The circumferential bent part with a seating surface 130 for seating magnets M placed on an inside surface of a side wall 13b extended forward from an edge of a rear wall of the rotor 5 permits an easy fabrication of the rotor since the seating surface 130 supports the magnet M easily when the magnet M is attached to the inside surface of the rotor 5.

The hub 132 in a center part of the rear wall 13a having through holes 131 permits to pass fastening members 15a, such as bolts, in mounting the rotor 5 on the shaft 4, and the plurality of radial cooling fins 133 each with a length permits blowing of air toward the stator 6 to cool heat from the stator 6 when the rotor 5 rotates.

The cooling fin 133 is formed by lancing to direct an opened side of the rotor 5, and a through hole 134 formed in the lancing serves as an air hole.

The rotor 5 formed of steel plate by pressing reduces a time period required for fabrication of the rotor 5, and improves productivity.

The embossing 135 between adjacent cooling fins 133 on the rear wall 13a of the rotor 5 improves an overall strength of the rotor 5, and the drain hole 136 in the embossing 135 permits to discharge water through the drain hole 136.

The connector 16, formed by a plastic injecting molding, has a vibration mode different from a vibration mode of the rotor 5 of steel plate, to attenuate vibration transmitted from the rotor 5 to the shaft 4.

The serration 164 in the inside circumferential surface of the hub of the connector 16 engaged with the serration 400 in the rear end part of the shaft 4 enables transmission of a rotation power from the rotor 5 to the shaft 4 through the connector 16 as it is.

Figure 13:
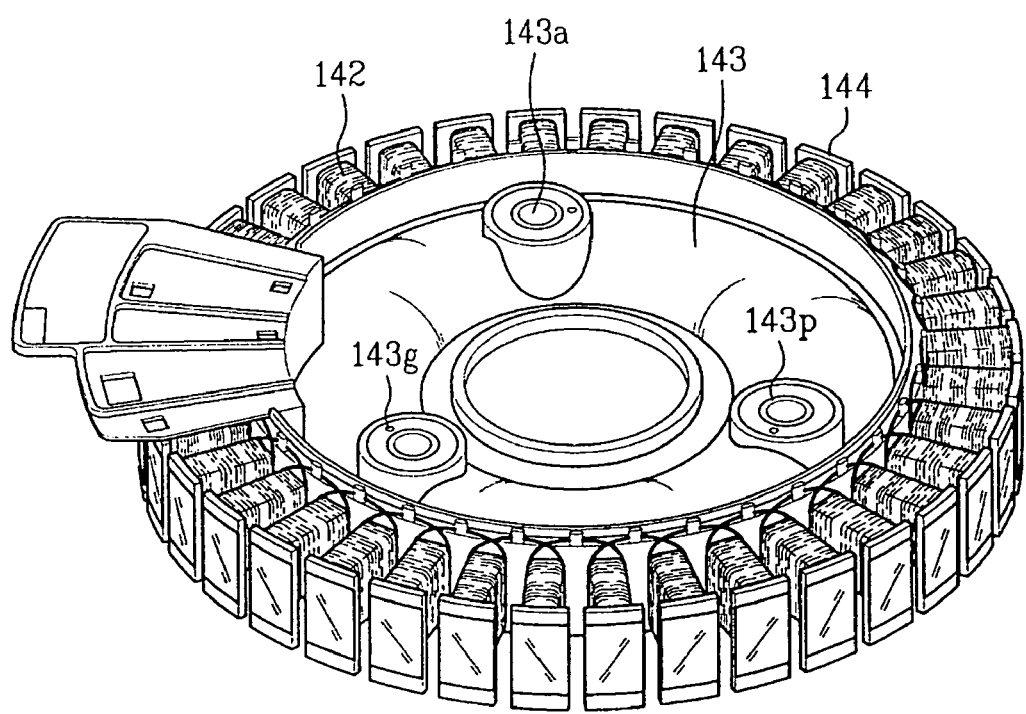
FIG. 13 illustrates a perspective view of a stator in a driving part of a drum type washing machine in accordance with another preferred embodiment of the present invention.

FIG. 13 illustrates a perspective view of a stator in a driving part of a drum type washing machine in accordance with another preferred embodiment of the present invention.

Referring to FIG. 13, the stator 6 of the present invention includes a helical type core HC, an insulator 144 having the helical type core HC encapsulated therein, a coil wound on tooth portions 151 of the helical core HC, and fastening parts 143 formed as a unit with the insulator 144 so as to be projected toward an inside of the helical type core HC.

That is, the stator 6 in the embodiment has, not a structure in which the fastening parts are projected in a radial direction toward an inside of the helical type core HC from more than three positions, but a structure in which the fastening parts form a unit with the insulator 144 extended in a radial direction toward an inside of the helical type core HC.

Alike the foregoing embodiment, the helical type core HC has multiple layers formed by winding a steel plate in a helix starting from a bottom layer to a top layer, with a plurality of tooth portions 151 projected outwardly in a radial direction from a base part 150 of the helical type core HC, and recesses 152 in the base part 150 for reducing a stress in winding the helical type core HC.

There is a positioning hole 143g adjacent to the fastening hole 143a in the fastening part 143, if there is a positioning pin on the tub rear wall, for fitting in mounting the stator. Opposite to this, of course, the positioning pin may be formed adjacent to the fastening hole 143a, and the positioning hole may be formed in the tub rear wall.

Other parts and performances thereof of the embodiment are the same with the foregoing embodiment, of which repetitive descriptions are omitted.

In the meantime, the present invention is not limited to above embodiments, it is of course possible that dimensions, shapes, and materials may be changed as far as the changes do not depart from the spirit or scope of the invention.

For an example, the stator fastening part 7b may only have an outward radial direction extension from the cylindrical bearing supporting part 7a with stepped areas 70b-1 at preset intervals along a radial direction. Or, alternatively, the stator fastening part 7b may have alternate outward radial direction extensions from front part and rear part of the cylindrical bearing supporting part 7a in a circumferential direction connected at edges of the extensions substantially perpendicular to the extensions, without the stepped areas.

Figure 14:
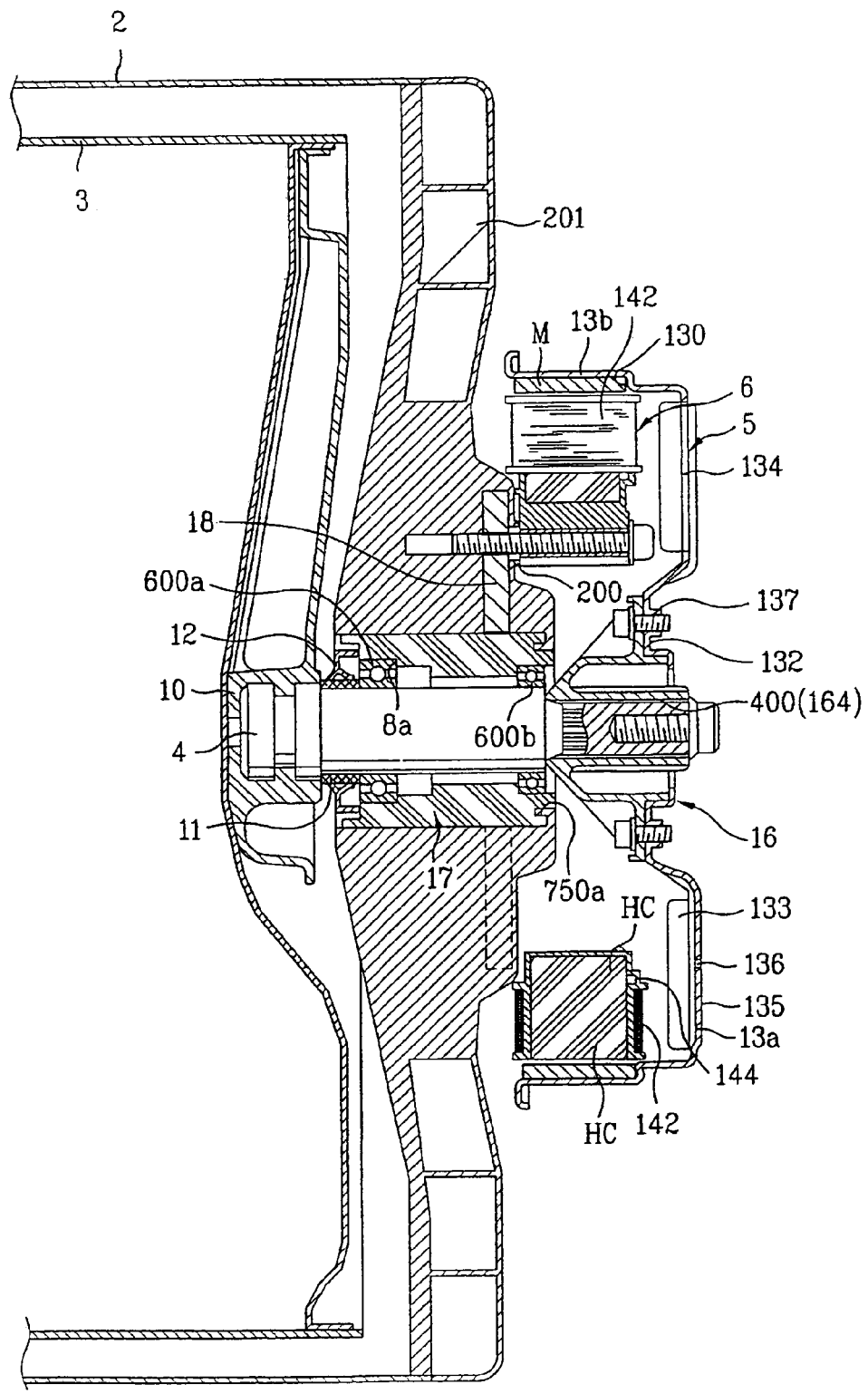
FIG. 14 illustrates a longitudinal section of a drum type washing machine in accordance with another preferred embodiment of the present invention.

FIG. 14 illustrates a longitudinal section of a drum type washing machine in accordance with another preferred embodiment of the present invention.

Referring to FIG. 14, the drum type washing machine includes a tub 2 having a wall for holding washing water therein and mounting a driving part thereon, and a sleeve form of bearing supporting part 17 for supporting bearings, in which both the tub 2 and the bearing supporting part 17 are formed as one unit, a drum 3 rotatably arranged inside of the tub 2, a shaft 4 passed through the tub 2 and connected to the drum 3 for transmission of a driving power from a motor to the drum, at least one bearing 600a inside of the bearing supporting part 17 for supporting the shaft 4, a rotor 5 engaged to a rear end part of the shaft 4 to form the motor together with the stator 6, and the stator 6 mounted on the tub 2 on an inner side of the rotor 5 and an outer side of the bearing supporting part 17 with fastening members. The stator 6 includes an annular helical type core HC having multiple layers formed by winding a steel plate having tooth portions 151 and base part in a helix starting from a bottom layer to a top layer, an insulator having the helical type core HC encapsulated therein, a coil wound on the tooth portions 151, and fastening parts formed as a unit with the insulator 144, having fastening holes projected toward an inside of the helical type core HC for fastening to the bearing supporting part 17.

Of course, there are a plurality of fastening holes in an outer region of the bearing supporting part 17 of the tub 2 for mounting the stator 6 of motor with fastening members. There is a metal tube 143p or a spring pin forcibly inserted in the fastening hole 143a of the fastening part 143.

Both the tub 2 and the bearing supporting part 17 may be formed by plastic injection molding, or the tub 2 may be formed of plastic, and the bearing supporting part 17 may be formed of a metal, such as an aluminum alloy.

More preferably, in the plastic injection molding of the tub 2, the tub 2 is injection molded in a state a tub supporting plate 18 of a metal formed as a separate piece from the bearing supporting part is buried in an outer region of the bearing supporting part 17.

Other parts not described herein are the same with the foregoing embodiment, and repetitive description of which will be omitted.

The performance of the embodiment will be described.

When a current flows to the stator 6, to rotate the rotor 5, the shaft 4 connected to the rotor 5 rotates. The shaft 4 rotates supported on a front bearing 600a and a rear bearing 600b inside of the bearing supporting part 17.

That is, a load on the shaft 4 is transmitted to the front, and rear bearings 600a, and 600b, and, therefrom, to the bearing supporting part 17. Since the bearing supporting part 17 is formed as a unit with the tub rear part, the bearing supporting part 17 can support the shaft 4, more stably.

The tub supporting plate 18 of a metal formed as a separate piece from the bearing supporting part, and buried in an outer region of the bearing supporting part 17 in the injection molding of the tub 2 permits to dispense with a separate reinforcing liner attached to the tub rear wall, enough to secure a supporting force for the stator 6 mounted on the tub rear wall even if the BLDC motor is mounted on the tub wall directly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The drum type washing machine of the present invention has the following advantages.

First, the direct drive type motor reduces noise, out of order, and power loss, and the bearing housing of a metal can be applied to a product with a drying function, as the bearing housing has no thermal deformation.

Second, the rotor 5 of a steel plate formed by pressing reduces a fabrication time period, and improves a productivity.

Third, the helical type core permits to reduce waste of material, easy fabrication, and increase a rigidity of the fastening part of the stator 6 to reduce noise and vibration, and improve mechanical reliability, and a lifetime.

Fourth, the difference of vibration modes of the rotor and the connector permits to reduce vibration transmitted from the rotor to the shaft, and the stator fastening part 7b permits rigid mounting of the stator 6 on the tub rear wall, and maintenance of concentricity of the stator 6, without damage of the tub rear wall.

Fifth, the elimination of tub supporter fitting work from the assembly line permits to simplify an assembly process, and easy maintenance by a serviceman in repair and replacement of component.

Sixth, even if the BLDC motor with a net stator weight over 1.5 kg, and a rotation speed varied in a range of 0~2000 RPM, or over is mounted on the tub wall directly, rear wall can support the stator, securely.

What is claimed is:

1. A drum type washing machine comprising:
    a tub of plastic having a wall for holding washing water therein and mounting a driving part thereon, wherein at least a portion of a tub rear wall having an inner surface and an outer surface;
    a drum rotatably arranged inside of the tub;
    a shaft passed through the tub and connected to the drum for transmission of a driving power from a motor to the drum;
    at least one bearing for supporting the shaft;
    a bearing housing having a sleeve form of bearing supporting part, and a stator fastening part extended in a radial direction from the bearing supporting part, where the stator fastening part is made of a material that is different from a material of the tub rear wall, and both of the bearing supporting part and the stator fastening part are disposed between the inner surface and the outer surface of the tub rear wall, while stator fastening holes in the stator fastening part are exposed from the outer surface of the tub rear wall;
    a rotor engaged to a rear end part of the shaft to form the motor together with the stator;
    and the stator mounted on the stator fastening part of the bearing housing with fastening members on an inner side of the rotor to form the motor together with the rotor, and the outer surface of the tub rear wall is between the stator and the stator fastening part,
    wherein the stator includes;
        an annular helical type core having multiple layers formed by winding a steel plate having tooth portions and a base part in a helix starting from a bottom layer to a top layer,
        an insulator having the helical type core encapsulated therein,
        a coil wound on the tooth portions, and
        fastening parts formed with the insulator, wherein fastening holes are at portions of the fastening parts projected toward an inside of the helical type core for fastening the stator to the bearing housing.

2. The drum type washing machine as claimed in claim 1, wherein the fastening part has a height greater than 20% of a total stack height of the helical type core.

3. The drum type washing machine as claimed in claim 1, wherein the fastening hole in the fastening part has a spring pin.

4. The drum type washing machine as claimed in claim 1, wherein the stator fastening part is made of metal and the tub rear wall is made of plastic.

5. A drum type washing machine comprising:
    a tub of plastic having a wall for holding washing water therein and mounting a driving part thereon, wherein at least a portion of a tub rear wall having an inner surface and an outer surface;
    a drum rotatably arranged inside of the tub;
    a shaft passed through the tub and connected to the drum for transmission of a driving power from a motor to the drum;
    at least one bearing for supporting the shaft;
    a bearing housing having a sleeve form of bearing supporting part, and a stator fastening part extended in a radial direction from the bearing supporting part, where the stator fastening part is made of a material that is different from a material of the tub rear wall, and both of the bearing supporting part and the stator fastening part are disposed between the inner surface and the outer surface of the tub rear wall, while stator fastening holes in the stator fastening part are exposed from the outer surface of the tub rear wall;
    a rotor engaged to a rear end part of the shaft to form the motor together with the stator;
    and the stator mounted on the stator fastening part of the bearing housing with fastening members on an inner side of the rotor to form the motor together with the rotor, and the outer surface of the tub rear wall is between the stator and the stator fastening part, wherein the stator includes;
        an annular helical type core having multiple layers formed by winding a steel plate having tooth portions and a base part in a helix starting from a bottom layer to a top layer, an insulator having the helical type core encapsulated therein, a coil wound on the tooth portions, and fastening parts, formed with the insulator, having three or more than three fastening holes at portions of the fastening parts projected toward an inside of the helical type core for fastening the stator to the bearing housing.

6. The drum type washing machine as claimed in claim 5, wherein the fastening part has a height greater than 20% of a total stack height of the helical type core.

7. The drum type washing machine as claimed in claim 5, wherein the fastening hole in the fastening part has a spring pin.

8. The drum type washing machine as claimed in claim 5, wherein the stator fastening part is made of metal and the tub rear wall is made of plastic.

9. A drum type washing machine comprising:
    a tub having a wall for holding washing water therein and mounting a driving part thereon, wherein at least a portion of the tub having an inner surface and an outer surface;
    a drum rotatably arranged inside of the tub;
    a shaft passed through the tub and connected to the drum for transmission of a driving power from a motor to the drum;
    at least one bearing for supporting the shaft;
    a bearing housing having a sleeve form of bearing supporting part inserted in the tub, and a stator fastening part formed as a unit with the bearing supporting part extended from the bearing supporting part, where the stator fastening part is made of a material that is different from a material of the tub, and the bearing supporting part and the stator fastening part disposed between the inner surface and the outer surface of the tub, a part of the stator fastening part exposed to an outside of the tub, with stator fastening holes formed in the exposed part of the stator fastening part;

a rotor engaged to a rear end part of the shaft to form the motor together with the stator; and the stator mounted on the stator fastening part of the bearing housing with fastening members on an inner side of the rotor to form the motor together with the rotor, and the outer surface of the tub is between the stator and the stator fastening part, wherein the stator includes;

an annular helical type core having multiple layers formed by winding a steel plate having tooth portions and a base part in a helix starting from a bottom layer to a top layer, an insulator having the helical type core encapsulated therein, a coil wound on the tooth portions, and fastening parts, formed with the insulator, having fastening holes at portions of the fastening parts projected toward an inside of the helical type core for fastening the stator to the bearing housing.

10. The drum type washing machine as claimed in claim 9, wherein the fastening part has a height greater than 20% of a total stack height of the helical type core.

11. The drum type washing machine as claimed in claim 9, wherein the fastening hole in the fastening part has a spring pin.

12. The drum type washing machine as claimed in claim 9, wherein the fastening hole in the fastening part has a metal tube press fit therein.

13. The drum type washing machine as claimed in claim 9, wherein the stator fastening part is made of metal and the tub is made of plastic.

14. A drum type washing machine comprising:

a tub having a wall for holding washing water therein and mounting a driving part thereon, wherein at least a portion of the tub having an inner surface and an outer surface;

a drum rotatably arranged inside of the tub;

a shaft passed through the tub and connected to the drum for transmission of a driving power from a motor to the drum;

at least one bearing for supporting the shaft;

a bearing housing having a sleeve form of bearing supporting part inserted in the tub, and a stator fastening part formed as a unit with the bearing supporting part extended in a radial direction from the bearing supporting part, where the stator fastening part is made of a material that is different from a material of the tub, and the bearing supporting part and the stator fastening part disposed between the inner surface and the outer surface of the tub, a part of the stator fastening part exposed to an outside of the tub, with stator fastening holes formed in the exposed part of the stator fastening part;

a rotor engaged to a rear end part of the shaft to form the motor together with the stator;

and the stator mounted on the stator fastening part of the bearing housing with fastening members on an inner side of the rotor to form the motor together with the rotor, and the outer surface of the tub is between the stator and the stator fastening part wherein the stator includes;

an annular helical type core having multiple layers formed by winding a steel plate having tooth portions and a base part in a helix starting from a bottom layer to a top layer, an insulator having the helical type core encapsulated therein, a coil wound on the tooth portions, and fastening parts, formed as a unit with the insulator, having three or more than three fastening holes at portions of the fastening parts projected toward an inside of the helical type core for fastening the stator to the bearing housing.

15. The drum type washing machine as claimed in claim 14, wherein the fastening part has a height greater than 20% of a total stack height of the helical type core.

16. The drum type washing machine as claimed in claim 14, wherein the fastening hole in the fastening part has a spring pin.

17. The drum type washing machine as claimed in claim 14, wherein the fastening hole in the fastening part has a metal tube press fit therein.

18. The drum type washing machine as claimed in claim 14, wherein the stator fastening part is made of metal and the tub is made of plastic.

19. A drum type washing machine comprising:

a tub of plastic having a wall for holding washing water therein and mounting a driving part thereon, wherein at least a portion of a tub rear wall having an inner surface and an outer surface;

a drum rotatably arranged inside of the tub;

a shaft passed through the tub and connected to the drum for transmission of a driving power from a motor to the drum;

at least one bearing for supporting the shaft;

a bearing housing having a sleeve form of bearing supporting part, and a stator fastening part extended in a radial direction from the bearing supporting part, where the stator fastening part is made of a material that is different from a material of the tub rear wall, wherein both of the bearing supporting part and the stator fastening part are disposed between the inner surface and the outer surface of the tub rear wall, while stator fastening holes in the stator fastening part are from the outer surface of the tub rear wall;

a rotor engaged to a rear end part of the shaft to form the motor together with the stator;

and the stator mounted on the stator fastening part of the bearing housing with fastening members on an inner side of the rotor to form the motor together with the rotor, and the outer surface of the tub rear wall is between the stator and the stator fastening part.

20. The drum type washing machine as claimed in claim 19, wherein the stator includes:

a core, an insulator having the core encapsulated therein, a coil wound on tooth portions, and fastening parts formed with the insulator, having fastening holes projected toward an inside of the core for fastening the stator to the bearing housing.

21. The drum type washing machine as claimed in claim 19, wherein the stator includes:

a core having a helical wound stack, an insulator of an insulating material having the core encapsulated therein, a coil wound on tooth portions of the helical core, and three or more than three fastening parts formed as a unit with the insulator, projected toward an inside of the core.

22. The drum type washing machine as claimed in claim 19, wherein the stator fastening part of the bearing housing includes an extension in an outward radial direction from the cylindrical bearing supporting part, having steps along the radial direction at preset intervals.

23. The drum type washing machine as claimed in claim 19, wherein the stator fastening part includes alternate outward radial direction extensions from front part, and rear part of the cylindrical bearing supporting part in a circumferential direction connected at edges of the extensions substantially perpendicular to the extensions.

24. The drum type washing machine as claimed in claim 19, wherein the stator fastening part includes alternate outward radial direction extensions from front part, and rear part of the cylindrical bearing supporting part in a circumferential direction connected at edges of the extensions substantially perpendicular to the extensions, the extension having steps at preset intervals along the radial direction.

25. The drum type washing machine as claimed in claim 19, further comprising a positioning hole adjacent to the stator fastening hole in the stator fastening part in correspondence to the positioning pin on the stator.

26. The drum type washing machine as claimed in claim 19, wherein the tub rear wall includes bosses at parts of the tub rear wall opposite to the stator fastening holes for preventing the stator fastening part from coming into direct contact with the stator, thereby preventing the insulator of the stator from being broken due to a fastening force applied thereto in mounting the stator.

27. The drum type washing machine as claimed in claim 19, wherein the stator fastening part includes a plurality of radial direction outward extensions from the cylindrical bearing supporting part separated at regular intervals in a circumferential direction to form a plurality of separated radial segments.

28. The drum type washing machine as claimed in claim 19, wherein the stator fastening part is made of metal and the tub rear wall is made of plastic.

29. A drum type washing machine comprising:
a tub of plastic having a wall for holding washing water therein and mounting a driving part thereon;
a drum rotatably arranged inside of the tub;
a shaft passed through the tub and connected to the drum for transmission of a driving power from a motor to the drum;
at least one bearing for supporting the shaft;
a bearing housing having a sleeve form of bearing supporting part inserted in the tub wall, and a stator fastening part formed as a unit with the bearing supporting part extended in a radial direction from the bearing supporting part, where the stator fastening part is made of a material that is different from a material of the tub, and the bearing supporting part and the stator fastening part disposed between an inner surface and an outer surface of the tub, a part of the stator fastening part exposed to an outside of the tub, with stator fastening holes formed in the exposed part;
a rotor engaged to a rear end part of the shaft to form the motor together with the stator; and
the stator with a weight heavier than 1.5 kg mounted on the stator fastening part of the bearing housing with fastening members on an inner side of the rotor to form the motor together with the rotor, and the outer surface of the tub is between the stator and the stator fastening part.

30. The drum type washing machine as claimed in claim 29, wherein the stator fastening part includes a plurality of radial direction outward extensions from the cylindrical bearing supporting part separated at regular intervals in a circumferential direction to form a plurality of separated radial segments.

31. The drum type washing machine as claimed in claim 29, further comprising a positioning hole adjacent to the stator fastening hole in the stator fastening part in correspondence to the positioning pin on the stator.

32. The drum type washing machine as claimed in claim 29, wherein the stator includes a core, an insulator having the core encapsulated therein, a coil wound on tooth portions, and fastening parts formed as a unit with the insulator, having fastening holes projected toward an inside of the core for fastening the stator to the bearing housing.

33. The drum type washing machine as claimed in claim 29, wherein the stator includes a core having a helical wound stack, an insulator of an insulating material having the core encapsulated therein, a coil wound on tooth portions of the helical core, and three or more than three fastening parts formed as a unit with the insulator, projected toward an inside of the core.

34. The drum type washing machine as claimed in claim 33, wherein the helical type core includes: multiple layers formed by winding in a helix starting from a bottom layer to a top layer, tooth portions projected outwardly in a radial direction from a base part, and recesses in the base part for reducing stress in the winding of the helical type core.

35. The drum type washing machine as claimed in claim 34, wherein the helical type core includes rivets passed through holes in the base part for fastening the layers, respectively.

36. The drum type washing machine as claimed in claim 34, wherein the recess is rectangular, or trapezoidal.

37. The drum type washing machine as claimed in claim 33, wherein the helical type core includes; welded parts of the layer with the base part at the bottom layer and the top layer where the winding starts and ends respectively.

38. The drum type washing machine as claimed in claim 29, wherein the stator fastening part is made of metal and the tub is made of plastic.

39. A drum type washing machine comprising:
a tub having a wall for holding washing water therein and mounting a driving part thereon, and a sleeve form of bearing supporting part for supporting bearings, and a tub supporting plate located at an outer region of the bearing supporting part in which the tub, the bearing supporting part and the tub supporting plate are integrated as one unit, where the tub supporting plate is made of a material that is different from the material of the tub;
a drum rotatably arranged inside of the tub;
a shaft passed through the tub and connected to the drum for transmission of a driving power from a motor to the drum;
at least one bearing inside of the bearing supporting part for supporting the shaft;
a rotor engaged to a rear end part of the shaft to form the motor together with a stator;
and the stator mounted on the tub on an inner side of the rotor and an outer side of the tub supporting plate with fastening members, and a surface of the tub is between the stator and the tub supporting plate, wherein the stator includes
an annular helical type core having multiple layers formed by winding a steel plate having tooth portions and base part in a helix starting from a bottom layer to a top layer,
an insulator having the helical type core encapsulated therein,
a coil wound on the tooth portions,
fastening parts formed with the insulator, having fastening holes at portions of the fastening parts projected toward an inside of the helical type core, and
fasteners for fastening the stator to the bearing housing via the fastening holes.

40. The drum type washing machine as claimed in claim 39, wherein the tub supporting plate is made of metal and formed as a separate piece from the bearing supporting part.

41. The drum type washing machine as claimed in claim 40, wherein the tub is injection molded such that the tub supporting plate is buried in the tub.

42. The drum type washing machine as claimed in claim 39, wherein the tub supporting plate is made of metal and the tub is made of plastic.

43. A washing machine comprising:
a tub made of plastic and storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, where the stator fastening part is made of a material that is different from a material of the tub, wherein the tub has an inner surface and an outer surface, and the bearing supporting part and the stator fastening part are disposed between the inner surface and the outer surface of the tub;
a rotor coupled to a rear end part of the shaft; and
a stator disposed within the rotor and mounted on the stator fastening part of the bearing housing to form the motor together with the rotor, and the outer surface of the tub is between the stator and the stator fastening part.

44. The washing machine as claimed in claim 43, wherein the stator fastening part is made of metal and the tub is made of plastic.

45. A washing machine comprising:
a tub made of plastic and storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are inserted into the tub rear wall;
a rotor coupled to a rear end part of the shaft; and
a stator disposed within the rotor and mounted on the stator fastening part of the bearing housing to form the motor together with the rotor, and a surface of the tub rear wall is between the stator and the stator fastening part, wherein the stator includes;
a core,
an insulator encapsulating the core,
fastening parts formed with the insulator and having fastening holes, wherein fasteners fasten the stator to the stator fastening part via the fastening holes.

46. The washing machine as claimed in claim 45, wherein the stator fastening part is made of metal and the tub rear wall is made of plastic.

47. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a rotor coupled to a rear end part of the shaft;
a stator disposed within the rotor and to form the motor together with the rotor;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are inserted into the tub rear wall, and an inserted portion of the stator fastening part is coupled to the stator with a surface of the tub rear wall between the stator and the stator fastening part.

48. The washing machine as claimed in claim 47, wherein the bearing supporting part and the stator fastening part are buried in a tub rear wall.

49. The washing machine as claimed in claim 47, wherein the bearing supporting part and the stator fastening part are embedded in a tub rear wall.

50. The washing machine as claimed in claim 47, wherein the bearing supporting part and the stator fastening part are entirely enclosed by a tub rear wall.

51. The washing machine as claimed in claim 47, wherein upper surfaces of the bearing supporting part and the stator fastening part are covered by a tub rear wall.

52. The washing machine as claimed in claim 47, wherein the bearing supporting part and the stator fastening part are inserted into a tub rear wall such that the stator fastening part is not exposed from the tub.

53. The washing machine as claimed in claim 47, wherein the stator fastening part has at least one stator fastening hole and only the at least one stator fastening hole is exposed from the tub.

54. The washing machine as claimed in claim 47, wherein the stator fastening part is formed from one piece of material.

55. The washing machine as claimed in claim 47, wherein the stator fastening part is made of metal and the tub rear wall is made of plastic.

56. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are buried in the tub rear wall;
a rotor coupled to a rear end part of the shaft; and
a stator disposed within the rotor and mounted on the stator fastening part of the bearing housing with a surface of the rear wall between the stator and the stator fastening part.

57. The washing machine as claimed in claim 56, wherein the bearing supporting part and the stator fastening part are embedded in the tub rear wall.

58. The washing machine as claimed in claim 56, wherein the bearing supporting part and the stator fastening part are entirely enclosed by the tub rear wall.

59. The washing machine as claimed in claim 56, wherein upper surfaces of the bearing supporting part and the stator fastening part are covered by the tub rear wall.

60. The washing machine as claimed in claim 56, wherein the bearing supporting part and the stator fastening part are inserted into the tub rear wall so as not to be exposed from the tub.

61. The washing machine as claimed in claim 56, wherein the stator fastening part has at least one stator fastening hole and only the at least one stator fastening hole is exposed from the tub.

62. The washing machine as claimed in claim 56, wherein the stator includes;
   a core;
   an insulator made of an electric insulating material and encapsulating the core; and fastening parts formed with the insulator and having fastening holes.

63. The washing machine as claimed in claim 62, wherein fasteners fasten the stator to the stator fastening part via the fastening holes.

64. The washing machine as claimed in claim 56, wherein the stator fastening part includes at least one step.

65. The washing machine as claimed in claim 56, wherein the stator fastening part has steps formed along a circumferential direction.

66. The washing machine as claimed in claim 56, wherein the stator fastening part has steps formed along a radial direction.

67. The washing machine as claimed in claim 56, wherein the stator fastening part includes recesses extending in a radial direction.

68. The washing machine as claimed in claim 67, wherein each of the recesses is formed by bending a portion of the stator fastening part.

69. The washing machine as claimed in claim 67, wherein the stator fastening part has steps formed along a radial direction.

70. The washing machine as claimed in claim 56, wherein the stator fastening part includes a plurality of first and second extensions extending in a radial direction from the bearing supporting part, and wherein the first and second extensions are arranged alternately along a circumferential direction.

71. The washing machine as claimed in claim 70, wherein the second extensions are disposed in front of the first extensions.

72. The washing machine as claimed in claim 70, wherein the first extensions are provided around a rear part of the bearing supporting part and the second extensions are provided around a front part of the bearing supporting part.

73. The washing machine as claimed in claim 70, wherein the stator fastening part further includes a plurality of third extension each connecting the adjacent the first and second extensions.

74. The washing machine as claimed in claim 70, wherein each of the first extension has steps formed along a radial direction.

75. The washing machine as claimed in claim 56, wherein the stator fastening part includes a plurality of extensions extending in a radial direction from the bearing supporting part.

76. The washing machine as claimed in claim 75, wherein the extensions have steps formed along a radial direction.

77. The washing machine as claimed in claim 75, wherein the adjacent extensions are connected with each other.

78. The washing machine as claimed in claim 56, wherein the tub rear wall includes a boss formed around a stator fastening hole of the stator fastening part for preventing the tub rear wall from coming into direct contact with the stator.

79. The washing machine as claimed in claim 56, wherein the stator fastening part includes a rib formed thereon for increasing a bonding force with plastic of the injection molding of the tub.

80. The washing machine as claimed in claim 79, wherein the rib is formed along a circumferential direction and wherein the rib has fastening bosses each with the stator fastening hole formed therein.

81. The washing machine as claimed in claim 56, further comprising a positioning part provided at the stator and the stator fastening part to position the stator when the stator is coupled to the stator fastening part in order to secure concentricity of the stator.

82. The washing machine as claimed in claim 81, wherein the positioning part includes;
   a positioning hole provided at any one of the stator and the stator fastening part, and
   a positioning protrusion provided at the other of the stator and the stator fastening part, wherein the positioning protrusion is configured to be inserted into the positioning hole.

83. The washing machine as claimed in claim 81, wherein the positioning part includes a positioning hole provided at the stator fastening part, and a positioning protrusion provided at the stator, wherein the positioning protrusion is configured to be inserted into the positioning hole.

84. The washing machine as claimed in claim 83, wherein the positioning hole is disposed adjacent to a stator fastening hole in the stator fastening part.

85. The washing machine as claimed in claim 56, wherein the bearing housing is formed as one body with the tub.

86. The washing machine as claimed in claim 56, wherein the bearing housing is inserted and integrated with the rear wall of the tub by injection molding.

87. The washing machine as claimed in claim 56, wherein the stator fastening part is formed as one body with the bearing supporting part.

88. The washing machine as claimed in claim 56, wherein the stator fastening part is made of metal and the tub rear wall is made of plastic.

* * * * *

US007418843C1

(12) EX PARTE REEXAMINATION CERTIFICATE (7903rd)
United States Patent
Kim et al.

(10) Number: US 7,418,843 C1
(45) Certificate Issued: Nov. 30, 2010

(54) DRUM TYPE WASHING MACHINE

(75) Inventors: Gon Kim, Changwon-si (KR); Chi Wan Hur, Changwon-si (KR); Yu Beom Kang, Changwon-si (KR); Sang Man Je, Koje-si (KR); Kang Mo Choi, Masan-si (KR); Jae Kyum Kim, Gimhae-si (KR); Ho Cheol Kwon, Changwon-si (KR)

(73) Assignee: LG Electronics, Inc., Seoul (KR)

Reexamination Request:
   No. 90/009,362, Dec. 15, 2008

Reexamination Certificate for:
   Patent No.: 7,418,843
   Issued: Sep. 2, 2008
   Appl. No.: 10/730,281
   Filed: Dec. 9, 2003

(30)  Foreign Application Priority Data

Dec. 10, 2002 (KR) ................................. 10-2002-0078337
Dec. 2, 2003  (KR) ................................. 10-2003-0086841

(51) Int. Cl.
   *B08B 3/12*    (2006.01)
   *D06F 21/00*   (2006.01)
   *D06F 23/00*   (2006.01)
   *D06F 25/00*   (2006.01)

(52) U.S. Cl. .................. 68/140; 68/3 R; 68/23.1; 68/253 C; 68/269 C; 68/269 R; 310/216.115; 310/216.127; 310/216.133; 310/257; 310/263; 310/264

(58) Field of Classification Search ................... 68/23.1, 68/140; 310/3 R, 216, 115, 127, 216.133
See application file for complete search history.

(56)  References Cited

U.S. PATENT DOCUMENTS

| 3,227,030 | A |   | 1/1966  | Preziosi et al.              |
|-----------|---|---|---------|------------------------------|
| 4,216,663 | A | * | 8/1980  | Shacklock ............. 68/3 R |
| 4,995,598 | A |   | 2/1991  | Ingham                       |
| 5,040,285 | A | * | 8/1991  | Williams et al. ........ 25/596 |
| 5,150,589 | A |   | 9/1992  | Williams et al.              |
| 5,329,791 | A | * | 7/1994  | Cargnel et al. ........... 68/24 |
| 5,737,944 | A |   | 4/1998  | Nishimura et al.             |
| 6,279,357 | B1| * | 8/2001  | Didlick et al. ........... 68/20 |
| 6,460,382 | B1|   | 10/2002 | Kim et al.                   |
| 7,380,424 | B2|   | 6/2008  | Kim et al.                   |
| 7,444,841 | B2|   | 11/2008 | Kim et al.                   |
| 2002/0194884 | A1 | | 12/2002 | Heyder et al.              |
| 2006/0196233 | A1 | | 9/2006  | Kim et al.                 |
| 2007/0113597 | A1 | | 5/2007  | Kim                        |
| 2007/0125135 | A1 | | 6/2007  | Kim et al.                 |

FOREIGN PATENT DOCUMENTS

| GB | 2333300      | 7/1999  |
| GB | 2333 300   A | 7/1999  |
| JP | 9-182368     | 7/1997  |
| JP | 2000-042287  | 2/2000  |
| JP | 2000-325693  | 11/2000 |
| KR | 1997-0051370 | 10/1997 |
| KR | 1999 0030909 | 5/1999  |
| WO | WO 01/44556  | 6/2001  |

* cited by examiner

*Primary Examiner*—Jimmy G Foster

(57) ABSTRACT

A washing machine has a tub that may be made of plastic. A drum is rotatably installed in the tub. A shaft may pass through the tub and connect to the drum for transmission of a driving power from a motor to the drum. The washing machine has a bearing supporting part and a stator fastening part extended in a radial direction from the bearing supporting part, where the tub has an inner surface and an outer surface, and the bearing supporting part and the stator fastening part are disposed between the inner surface and the outer surface of the tub.

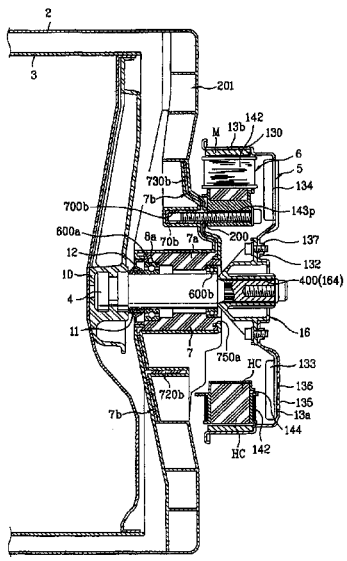

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-44 is confirmed.

Claims 48-52 and 70 are cancelled.

Claims 45-47, 56 and 71-75 are determined to be patentable as amended.

Claims 53-55, 57-69 and 76-88, dependent on an amended claim, are determined to be patentable.

New claims 89-136 are added and determined to be patentable.

45. A *direct drive drum type* washing machine comprising:
a tub made of plastic and storing washing water therein;
a drum rotatably installed in the tub;
a shaft passing through the tub and connected *directly* to the drum for transmission of a driving power from a motor to the drum *directly*;
at least one bearing for supporting the shaft;
a bearing housing having a bearing supporting part and a stator fastening [part] *part, having a form of a plate,* extended in a radial direction from the bearing supporting part, and the stator fastening part is made of a material that is different from a material of a tub rear wall, wherein the bearing supporting part and the stator fastening part are inserted into the tub rear [wall;] *wall, and wherein the stator fastening part having the form of the plate located at an outer region of the bearing supporting part in which the tub, the bearing supporting part, and the stator fastening part having the form of the plate are integrated as one unit;*
a rotor *directly* coupled to a rear end part of the shaft; and
a stator disposed within the rotor and mounted on the stator fastening part of the bearing housing to form the motor together with the rotor, and a surface of the tub rear wall is between the stator and the stator fastening part,
wherein the stator includes;
a core,
an insulator encapsulating the core,
fastening parts formed with the insulator and having fastening holes, wherein fasteners fasten the stator to the stator fastening part via the fastening holes.

46. The *direct drive drum type* washing machine as claimed in claim 45, wherein the stator fastening part is made of metal and the tub rear wall is made of plastic.

47. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a rotor coupled to a rear end part of the shaft;
a stator disposed within the rotor and to form the motor together with the rotor;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are inserted into the tub rear wall, and an inserted portion of the stator fastening part is coupled to the stator with a surface of the tub rear wall between the stator and the stator fastening [part.] *part, and the bearing supporting part and the stator fastening part are entirely enclosed by a tub rear wall.*

56. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are buried in the tub rear wall;
a rotor coupled to a rear end part of the shaft; and
a stator disposed within the rotor and mounted on the stator fastening part of the bearing housing with a surface of the rear wall between the stator and the stator fastening [part.] *part, wherein the stator fastening part includes a plurality of first and second extensions extending in a radial direction from the bearing supporting part, and wherein the first and second extensions are arranged alternatively along a circumferential direction.*

71. The washing machine as claimed in claim [70] *56*, wherein the second extensions are disposed in front of the first extensions.

72. The washing machine as claimed in claim [70] *56*, wherein the first extensions are provided around a rear part of the bearing supporting part and the second extensions are provided around a front part of the bearing supporting part.

73. The washing machine as claimed in claim [70] *56*, wherein the stator fastening part further includes a plurality of third extension each connecting the adjacent the first and second extensions.

74. The washing machine as claimed in claim [70] *56*, wherein each of the first extension has steps formed along a radial direction.

75. The washing machine as claimed in claim 56, wherein the stator fastening part includes a plurality of extensions extending in a radial direction *directly* from the bearing supporting part.

*89. The direct drive drum type washing machine as claimed in claim 45, wherein the stator fastening part is entirely inserted into the tub rear wall.*

90. The direct drive drum type washing machine as claimed in claim 45, wherein the bearing supporting part is entirely inserted into the tub rear wall.

91. The direct drive drum type washing machine as claimed in claim 45, wherein the bearing supporting part and the stator fastening part are entirely inserted into the tub rear wall.

92. The direct drive drum type washing machine as claimed in claim 45, wherein the stator fastening part is extended in the radial direction directly from the bearing support part.

93. The direct drive drum type washing machine as claimed in claim 47, wherein the stator fastening part is extended in the radial direction directly from the bearing support part.

94. The direct drive drum type washing machine as claimed in claim 47, wherein the stator fastening part includes a rib formed thereon for increasing a bonding force with plastic of the injection molding of the tub.

95. The direct drive drum type washing machine as claimed in 94, wherein the rib is formed along a circumferential direction and wherein the rib has fastening bosses each with a stator fastening hole formed therein.

96. The washing machine as claimed in claim 56, wherein the bearing supporting part and the stator fastening part are entirely enclosed in the tub rear wall.

97. The washing machine as claimed in claim 56, wherein the stator fastening part includes recesses arranged in a circumferential direction.

98. The washing machine as claimed in claim 56, wherein the surface of the tub rear wall is sandwiched between the stator and the stator fastening part.

99. The washing machine as claimed in claim 56, wherein the bearing supporting part is entirely enclosed by the tub rear wall.

100. The washing machine as claimed in claim 56, wherein the stator fastening part is entirely enclosed by the tub rear wall.

101. The washing machine as claimed in claim 56, where the stator fastening part is entirely buried in the tub rear wall.

102. The washing machine as claimed in claim 56, wherein the bearing supporting part is entirely buried in the tub rear wall.

103. The washing machine as claimed in claim 56, where the bearing supporting part and the stator fastening part are entirely buried in the tub rear wall.

104. A direct drive drum type washing machine comprising:
 a tub for storing washing water therein;
 a drum rotatably installed in the tub;
 a shaft passing through the tub and connected directly to the drum for transmission of a driving power from a motor to the drum directly;
 at least one bearing for supporting the shaft;
 a rotor directly coupled to a rear end part of the shaft;
 a stator disposed within the rotor and to form the motor together with the rotor;
 a bearing housing having a bearing supporting part and a stator fastening part, having a form of a plate, extended in a radial direction from the bearing supporting part, and the stator fastening part is made of a material that is different from a material of a tub rear wall, wherein the bearing supporting part and the stator fastening part are inserted into the tub rear wall, and an inserted portion of the stator fastening part is coupled to the stator with a surface of the tub rear wall between the stator and the stator fastening part, and wherein the stator fastening part having the form of the plate located at an outer region of the bearing supporting part in which the tub, the bearing supporting part, and the stator fastening part having the form of the plate are integrated as one unit.

105. The direct drive drum type washing machine as claimed in claim 104, wherein the stator fastening part is extended in the radial direction directly from the bearing support part.

106. The direct drive drum type washing machine as claimed in claim 104, wherein the stator fastening part is entirely inserted into the tub rear wall.

107. The direct drive drum type washing machine as claimed in claim 104, wherein the bearing supporting part is entirely inserted into the tub rear wall.

108. The direct drive drum type washing machine as claimed in claim 104, wherein the bearing supporting part and the stator fastening part are entirely inserted into the tub rear wall.

109. A direct drive drum type washing machine comprising:
 a tub for storing washing water therein;
 a drum rotatably installed in the tub;
 a shaft passing through the tub and connected directly to the drum for transmission of a driving power from a motor to the drum directly;
 at least one bearing for supporting the shaft;
 a bearing housing having a bearing supporting part and a stator fastening part, having a form of a plate, extended in a radial direction from the bearing supporting part, and the stator fastening part is made of a material that is different from a material of a tub rear wall, wherein the bearing supporting part and the stator fastening part are buried in the tub rear wall, and wherein the stator fastening part having the form of the plate located at an outer region of the bearing supporting part in which the tub, the bearing supporting part, and the stator fastening part having the form of the plate are integrated as one unit;
 a rotor directly coupled to a rear end part of the shaft; and
 a stator disposed within the rotor and mounted on the stator fastening part of the bearing housing with a surface of the rear wall between the stator and the stator fastening part.

110. The washing machine as claimed in claim 109, wherein the bearing supporting part and the stator fastening part are embedded in the tub rear wall.

111. The washing machine as claimed in claim 109, wherein the bearing supporting part and the stator fastening part are entirely enclosed by the tub rear wall.

112. The washing machine as claimed in claim 109, wherein upper surfaces of the bearing supporting part and the stator fastening part are covered by the tub rear wall.

113. The washing machine as claimed in claim 109, wherein the bearing supporting part and the stator fastening part are inserted into the tub rear wall so as not to be exposed from the tub.

114. The washing machine as claimed in claim 109, wherein the stator fastening part has at least one stator fastening hole and only the at least one stator fastening hole is exposed from the tub.

115. The washing machine as claimed in claim 109, wherein the stator includes; a core; an insulator made of an electric insulating material and encapsulating the core; and fastening parts formed with the insulator and having fastening holes.

116. The washing machine as claimed in claim 109, wherein fasteners fasten the stator to the stator fastening part via the fastening holes.

117. The washing machine as claimed in claim 109, wherein the tub rear wall includes a boss formed around a stator fastening hole of the stator fastening part for preventing the tub rear wall from coming into direct contact with the stator.

118. The washing machine as claimed in claim 109, further comprising a positioning part provided at the stator and the stator fastening part to position the stator when the stator is coupled to the stator fastening part in order to secure concentricity of the stator.

119. The washing machine as claimed in claim 118, wherein the positioning part includes; a positioning hole provided at any one of the stator and the stator fastening part, and a positioning protrusion provided at the other of the stator and the stator fastening part, wherein the positioning protrusion is configured to be inserted into the positioning hole.

120. The washing machine as claimed in claim 118, wherein the positioning part includes a positioning hole provided at the stator fastening part, and a positioning protrusion provided at the stator, wherein the positioning protrusion is configured to be inserted into the positioning hole.

121. The washing machine as claimed in claim 120, wherein the positioning hole is disposed adjacent to a stator fastening hole in the stator fastening part.

122. The washing machine as claimed in claim 109, wherein the bearing housing is inserted and integrated with the rear wall of the tub by injection molding.

123. The washing machine as claimed in claim 109, wherein the surface of the tub rear wall is sandwiched between the stator and the stator fastening part.

124. The washing machine as claimed in claim 109, where the stator fastening part is entirely buried in the tub rear wall.

125. The washing machine as claimed in claim 109, wherein the bearing supporting part is entirely buried in the tub rear wall.

126. The washing machine as claimed in claim 109, where the bearing supporting part and the stator fastening part are entirely buried in the tub rear wall.

127. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, and the stator fastening part is made of a material that is different from a material of a tub rear wall, wherein the bearing supporting part and the stator fastening part are buried in the tub rear wall;
a rotor coupled to a rear end part of the shaft; and
a stator disposed within the rotor and mounted on the stator fastening part of the bearing housing with a surface of the rear wall between the stator and the stator fastening part wherein the stator fastening part includes a rib formed thereon, and the rib is formed along a circumferential direction and the rib has fastening bosses each with the stator fastening hole formed therein.

128. The washing machine as claimed in claim 127, wherein the surface of the tub rear wall is sandwiched between the stator and the stator fastening part.

129. The washing machine as claimed in claim 127, wherein the stator fastening part is entirely buried in the tub rear wall.

130. The washing machine as claimed in claim 127, wherein the bearing supporting part is entirely buried in the tub rear wall.

131. The washing machine as claimed in claim 127, where the bearing supporting part and the stator fastening part are entirely buried in the tub rear wall.

132. The direct drive drum type washing machine as claimed in claim 127, wherein the stator fastening part is extended in the radial direction directly from the bearing support part.

133. A washing machine comprising:
a tub for storing washing water therein;
a drum rotatably installed in the tub;
a shaft passing through the tub and connected to the drum for transmission of a driving power from a motor to the drum;
at least one bearing for supporting the shaft;
a bearing housing having a bearing supporting part and a stator fastening part extended in a radial direction from the bearing supporting part, and the stator fastening part is made of a material that is different from a material of a tub rear wall;
a rotor coupled to a rear end part of the shaft; and
a stator disposed within the rotor and mounted on the stator fastening part of the bearing housing with a surface of the rear wall between the stator and the stator fastening part, wherein the bearing supporting part and the stator fastening part are entirely enclosed by the tub rear wall.

134. The direct drive drum type washing machine as claimed in claim 133, wherein the stator fastening part is extended in the radial direction directly from the bearing support part.

135. The direct drive drum type washing machine as claimed in claim 133, wherein the stator fastening part includes a rib formed thereon for increasing a bonding force with plastic of the injection molding of the tub.

136. The direct drive drum type washing machine as claimed in 135, wherein the rib is formed along a circumferential direction and wherein the rib has fastening bosses each with a stator fastening hole formed therein.

* * * * *